US007805337B1

(12) United States Patent
Ogg

(10) Patent No.: US 7,805,337 B1
(45) Date of Patent: Sep. 28, 2010

(54) METHOD FOR DETERMINING PRODUCT VARIANTS AND MERGING PRODUCT IMAGE INFORMATION

(75) Inventor: Craig L. Ogg, Long Beach, CA (US)

(73) Assignee: ThisNext, Inc., Santa Monica, CA (US)

( * ) Notice: Subject to any disclaimer, the term of this patent is extended or adjusted under 35 U.S.C. 154(b) by 506 days.

(21) Appl. No.: 11/879,885

(22) Filed: Jul. 18, 2007

(51) Int. Cl.
*G06Q 30/00* (2006.01)
*G06F 17/30* (2006.01)

(52) U.S. Cl. .......................................... 705/26; 705/27

(58) Field of Classification Search ................... 705/26, 705/27; 706/18–20, 45, 49, 61; 700/49; 707/600–899; 715/206–208, 233
See application file for complete search history.

(56) References Cited

U.S. PATENT DOCUMENTS

| 7,630,968 | B2 * | 12/2009 | McCammon et al. ............... 1/1 |
| 2003/0061202 | A1 * | 3/2003 | Coleman ....................... 707/3 |
| 2004/0143600 | A1 * | 7/2004 | Musgrove et al. ........ 707/104.1 |
| 2005/0010494 | A1 * | 1/2005 | Mourad et al. ................. 705/26 |
| 2005/0055281 | A1 * | 3/2005 | Williams ...................... 705/26 |
| 2007/0073591 | A1 * | 3/2007 | Perry et al. ................... 705/26 |
| 2007/0118441 | A1 * | 5/2007 | Chatwani et al. .............. 705/27 |
| 2007/0239552 | A1 * | 10/2007 | Sundaresan .................. 705/26 |
| 2007/0288468 | A1 * | 12/2007 | Sundaresan et al. ........... 707/10 |
| 2008/0091548 | A1 * | 4/2008 | Kotas et al. ................... 705/26 |
| 2008/0228595 | A1 * | 9/2008 | Hill et al. ...................... 705/27 |

OTHER PUBLICATIONS

Solution Watch, "Kaboodle: Social Shopmarking", Oct. 26, 2005 http://www.solutionwatch.com/268/kaboodle-social-shopmarking/.*

* cited by examiner

*Primary Examiner*—Yogesh C Garg
*Assistant Examiner*—Matthew Zimmerman
(74) *Attorney, Agent, or Firm*—Khorsandi Patent Law Group, A Law Corp.; Marilyn R. Khorsandi

(57) ABSTRACT

An exemplary embodiment of the present invention comprises methods and computer systems for creating a cross-variation, cross-vendor view of a plurality of products. In the exemplary embodiment the exemplary computer system comprises a computer device programmed to identify a first relationship between a plurality of variations of a first particular product; and associate a first particular product identifier with the plurality of variations of the first particular product. The computer device would be further programmed to identify a second relationship between a plurality of variations of a second particular product; and associate a second particular product identifier with the plurality of variations of the second particular product. The exemplary embodiment would associate critiques input by various critiquing users regarding various variations of the first particular product with the first particular product. The exemplary embodiment would associate critiques input by various critiquing users regarding various variations of the second particular product with the second particular product. In response to a user requesting information about a variation of the first particular product, the exemplary embodiment would present a display of the critiques regarding various variations of the first particular product. In response to a user requesting information about a variation of the second particular product, the exemplary embodiment would present a display of the critiques regarding various variations of the second particular product.

1 Claim, 11 Drawing Sheets

METHOD FOR DETERMINING PRODUCT VARIANTS AND MERGING PRODUCT IMAGE INFORMATION

FIELD OF THE INVENTION

The field of the present invention is product information organization, filtering and presentation.

BACKGROUND OF THE INVENTION

Sometimes, shopping can be an exploration and discovery process. For example, sometimes, a person may go shopping to find a present for a friend or relative. Or a person may go shopping to find something special for themselves. Sometimes, shoppers buy things that others, such as, for example, sales persons, convince the shopper that they need or want the item.

In order for exploration and discovery shopping to be successful, a shopper may need to observe a multitude of products that are available for purchase. Unless a particular shopper has an opportunity to shop without time constraints, the number of products available for sale, and the diversity of locations at which products are available for sale; could present an overwhelming number of choices for a shopper. Moreover, faced with what a particular shopper may consider to be an overwhelming number of choices, the particular shopper may fall short of selecting a product that ideally suits them or the person for whom they are shopping. For example, a shopper searching for a gift that would satisfy a particular recipient might feel overwhelmed with the choices of gifts that might be available.

When faced with what may seem to be an overwhelming number of choices of products to explore, some shoppers may value the advice of others. For example, a man shopping for his wife's birthday gift, may seek the advice of a sales person that the man perceives as possibly having the same style, age, or other characteristic as the man's wife.

Some people, then, may be perceived by others as having both interests common to either the purchaser, or in the case of a gift, common to the gift recipient, and as also having some skill in picking product, or some knowledge about certain types of products. That is, some people may be perceived by others as being talented at picking unique and especially pleasing products.

Sometimes the person perceived as being either talented at picking pleasing products, or as having knowledge about certain types of products, and/or as having interests common to the shopper, or in the case of a gift, to the gift recipient, may not be a salesperson, but another shopper or consumer. For example, a man searching for a gift for his wife might ask a fellow woman shopper their opinion about certain products. As another example of a perceived expertise of a fellow shopper, a father shopping for a gift for a son or daughter that enjoys surfing might find it helpful to know of surfing related products that a particular fellow shopper in a surfing store finds interesting if the fellow shopper is perceived by the father as having some level of expertise and/or experience in selecting such products.

Sometimes a fellow shopper may be perceived as an expert shopper by a primary shopper who perceives the fellow shopper as having some level of expertise and/or experience in picking products of the type in which the primary shopper themselves is interested, and/or as sharing a strong affinity for the primary shopper's particular tastes and/or interests; or in the case of a gift, a fellow shopper may be perceived as an expert shopper by a primary shopper who perceives the fellow shopper as having some level of expertise and/or experience in picking products of the type in which the anticipated gift recipient is interested, and/or as sharing a strong affinity for the anticipated gift recipient's particular tastes and/or interests.

The experience of a perceived expert shopper may be of special interest to a primary shopper when a multitude of variables and considerations may be involved in selecting a particular product of a type of product for which a particular primary shopper may be shopping. Unless a particular primary shopper has an opportunity to research the multitude of variables and considerations, the particular primary shopper may be overwhelmed with the depth of research perceived by the particular primary shopper as being needed to make an intelligent choice. For example, a particular primary shopper that is in need of a new computer may feel overwhelmed with the amount of information the particular primary shopper perceives would be necessary to master before making an intelligent choice as to a new computer.

Such a primary shopper may perceive certain people as being especially knowledgeable about a particular type or class of product. For example, a particular computer consultant may be considered by a particular primary shopper as being up-to-date and in-the-know about computer hardware and software available in the market. The particular primary shopper in need of selecting a new computer, and who feels overwhelmed with the extent of research the particular primary shopper perceives as necessary to make an intelligent choice, may find it useful to learn of a particular computer consultant's opinions as to favorite computer picks in the marketplace.

Shoppers or consumers that are willing to share information about products that they may have purchased, pick, or otherwise like, are sometimes referred to herein as "curators."

The Internet has, in some ways, compounded the problem of exploring and discovering products. Before the Internet, a person typically only had to consider the choices of products available at local stores and malls. But the Internet has made available the possibility of exploring and discovering a world of products that might not previously have been accessible to many shoppers.

In serving the exploration and discovery nature of shopping, physical shopping malls feature stores; the stores in a mall are sometimes general merchandise stores that carry a variety of products, or, in the case of boutiques, are organized around some pre-established particular theme. For example, there are cookware stores that offer a variety of products related to cooking; there are youth clothing stores that are directed to offering clothes of a particular type and style genre; there are jewelry stores; there are shoe stores; there are leather goods stores; the list goes on and on.

Similar to physical stores, "online stores" and "online boutiques" have offered products directed to a pre-established particular theme. Online stores, similar to physical stores, may supply and ship the products they offer online.

Similar to physical shopping malls, some "online malls" feature "online stores" and/or "online boutiques" of products.

Similar to physical stores, an "online store," or an "online boutique," may cultivate a particular shopping/buying audience, and may, therefore, cultivate a particular supply and/or inventory of products to serve their respective shopping/buying audience.

Some Internet shoppers may not be familiar with, or may not want to rely on, a particular "online boutique's" selection of products. Rather, some Internet shoppers may prefer to explore a more diverse set of products.

The Internet, because of its massive breadth, can be searched, to locate a multitude of products. However, such searches may result in a serendipitous presentation of an overwhelming number of products.

Some way is needed to organize information about products, and present products to online shoppers in a way that serves the particular online shopper's desire to explore and discover products. Further, a way is needed to provide online shoppers with an effective way to explore products in a vendor-neutral, vendor-independent, inventory-independent manner; once a product is found that is to the shopper's liking, a way is needed to send the shopper to one or more places, such as, for example, online stores, that have the product available.

Some online sources have attempted to organize information about products, and provide ratings of products. However, for various reasons, including among others, those described briefly below, the product exploration and discovery processes offered by others has fallen short.

One issue that complicates organizing information and ratings about products, is that there may exist many vendor-specific views of what may appear to a shopping consumer (sometimes referred to herein as a "shopper") wanting to view ratings about a product, to be a single "product." For example, a single vendor may use any one of various coding schemes to represent product items for purposes of stock keeping and order-taking and -fulfillment. For example, some vendors may self-assign an internal number for stock-keeping and order-taking and -fulfillment. Such vendor-assigned (vendor-specific), internal stock-keeping codes are often referred to as an SKU (a Stock-Keeping Unit code). Vendor-specific SKU coding schemes are often structured so that each item that must be stocked and for which shoppers may submit an order are assigned a number that is unique within the vendor's own system.

Other vendors may use one or more "universal" coding schemes, such as UPC (Universal Product Code) codes, ISBN (International Standard Book Number (for books)) codes, ISSN (International Standard Serial Number (for magazines)) codes, and the like, as their own SKU.

Still other vendors may use manufacturer ID and model number as their own SKU.

Yet other vendors may use some combination of the above-mentioned coding schemes.

One result of the above-described vendor-specific schemes for coding various product items is that one vendor's SKU for a particular stocked item may be completely different than another vendor's SKU for the exact same item. For example, for a particular brand name (EXAMPLE BRAND) and type (retractable ball-point) of pen, a particular office supply store (Example Vendor 1) may use an internally assigned code of "X" to identify blue-ink EXAMPLE BRAND, retractable ball-point pens. The same office supply store may use an internally assigned code of "Y" to identify black-ink EXAMPLE BRAND, retractable ball-point pens.

Yet another office supply store (Example Vendor 2) may use an internally assigned code of "A" to identify blue-ink EXAMPLE BRAND, retractable ball-point pens may use an internally assigned code of "B" to identify black-ink EXAMPLE BRAND, retractable ball-point pens.

The above-outlined EXAMPLE BRAND, retractable ball-point pen example illustrates that across various vendor-specific coding schemes for identifying products, the same product, e.g., EXAMPLE BRAND, retractable ball-point pens, could appear to be four separate products, e.g., blue-ink EXAMPLE BRAND, retractable ball-point pens (Example Vendor 1, SKU X), blue-ink EXAMPLE BRAND, retractable ball-point pens (Example Vendor 2, SKU A), black-ink EXAMPLE BRAND, retractable ball-point pens (Example Vendor 1, SKU Y) and black-ink EXAMPLE BRAND, retractable ball-point pens (Example Vendor 2, SKU B).

It will be understood by someone with ordinary skill in the art that the above-outlined example is illustrative and non-limiting. Various additional types of variations, including, for example, packaging (single pen, package of six (6) pens, package of twelve (12) pens, etc.) may, for stock-keeping purposes for example, be separately identified by a vendor.

As compared to a vendor's need for stock-keeping, a shopper wanting to review ratings for a product, for example, retractable ball-point pens, may consider numerous variations, for example, ink color, packaging, and the like, to not be relevant to a rating of the product.

However, if ratings were kept according to individual vendor-assigned SKU's, such as, for example, by someone who purchased a particular item from a vendor, then as can be seen from the above-outlined example, a rating by someone that purchased a black-ink EXAMPLE BRAND, retractable ball-point pen from Example Vendor 1 could appear separately from a rating by someone that purchased a blue-ink EXAMPLE BRAND, retractable ball-point pen from Example Vendor 1; a rating by someone that purchased a blue-ink EXAMPLE BRAND, retractable ball-point pen from Example Vendor 1 could appear separately from a rating by someone that purchased a blue-ink EXAMPLE BRAND, retractable ball-point pen from Example Vendor 2.

A shopper wanting to review ratings for retractable ball-point pens may consider the color ink, packaging, and other variations to be irrelevant to the shopper's assessment whether to buy EXAMPLE BRAND retractable ball-point pens, as compared to other brand retractable ball-point pens. Yet further, a shopper wanting to review ratings for retractable ball-point pens may consider the vendor that offers such pens to be irrelevant to ratings of such pens.

Even so, ratings are sometimes presented on a particular vendor's website according to the particular item purchased by a rating consumer. For example, on some vendor websites, a vendor may present ratings and/or comments (sometimes, collectively referred to herein as critiques, or simply as ratings) by customers about items sold through the vendor's website. The ratings and/or comments, for example, may be collected only from customers that have purchased the relevant product from the vendor. Typically, the ratings and/or comments by a purchasing customer for a particular purchased item are presented on, or in association with, a page describing the particular item that the customer purchased. The ratings of items purchased by customers of the vendor are viewable by navigating to the vendor's own website. In many cases, ratings are only available on the vendor's website for items sold by the vendor. In many cases, no comparison of ratings of the same item purchased from other vendors is provided at the vendor's website.

Bloggers may publish ratings and/or comments about an item that the blogger has purchased or is otherwise familiar with on their own blog. Some blogs may provide an original image of an item that the blogger is rating or evaluating. Other blogs may use a third party website, such as, for example, FLICKR.COM, to host their image(s) and place what is known as a "widget" on their blog to retrieve content from the image hosting site. Still other blogs may provide a link to a webpage that presents an image of an item that the blogger is rating or evaluating. Or, yet further, a blog could use a combination of the above-mentioned methods of providing images for blog viewers. For example, a blogger rating an example item 1 may provide an original photo of a particular specimen of example item 1, may also provide a FLICKR™ "widget" for retrieving content hosted on the FLICKR.COM website, and may yet further provide a link to a particular vendor's website that displays one or more images of the item as well as product description text and pricing information. A rating about a product published by a blogger that link to a particular vendor's website does not provide any means for comparing other vendors' offerings of the same product.

There are websites that might be called collaborative shopping sites. For example, YAHOO!® offers a shopping community called YAHOO!® SHOPOSPHERE that provides shoppers with the ability to enter "Pick Lists" that include links to websites that provide information about an item and/or offer the item for sale. Many times, links to websites, such as vendor websites, that provide information about an item and/or offer the item for sale do not provide any means to compare the offer by others for sale of the same product.

One problem with the various above-described rating processes is that a consumer's rating that links to a particular webpage provides a rating of whatever basis of rating is provided at that particular webpage. That is, such a rating and link relates to a webpage. If the webpage is associated with only a particular variation of a product, then the rating relates to that particular variation, as compared to a broader view of the product. The following example is illustrative.

A first consumer uses an illustrative example rating website to rate a paperback edition of a particular Example Title and lists a link to a first vendor's webpage that displays an image of the paperback edition of the particular Example Title. Because of the nature of the subject matter, the first consumer's rating is directed to a rating of the content of the particular Example Title and does not relate to the fact that the rated item was a paperback edition as compared to another type of edition of the particular Example Title.

A second consumer uses the same illustrative example rating website to rate a hard cover edition of the same Example Title and lists a link to a second vendor's webpage that displays an image of the hardback edition of the same particular Example Title. Because of the nature of the subject matter, the second consumer's rating is directed to a rating of the content of the particular Example Title and does not relate to the fact that the rated item was a hard cover edition as compared to another type of edition of the particular Example Title.

Even though both the first consumer's rating and the second consumer's rating are directed to the subject matter of the Example Title and not the nature of the variation of the particular item rated, the illustrative example rating website represents the two ratings separately. A shopper uses the illustrative example rating website to search for ratings about the particular Example Title. Instead of returning a single product view to the searching shopper, the search results of the illustrative example rating website report a separate rating for the paperback, and a separate rating for the hardback.

Some way is needed to provide shopping users with the ability to explore and discover products in a vendor-neutral, variation-neutral way.

Further, even as to shoppers, a shopper wanting to review ratings for a "product" may have a very different view of what constitutes a "product" as compared to a shopper that is ready to purchase the product and wants to find a particular variation (e.g., a shopper may want to buy a blue-ink EXAMPLE BRAND retractable ball-point pen as compared to a black-ink EXAMPLE BRAND retractable ball-point pen). Accordingly, some way is needed to direct a shopping user of a "product" rating to vendors that offer for sale vendor-specific stock-keeping units that would be consistent with the shopping user's preferred variation.

SUMMARY OF THE INVENTION

An exemplary embodiment of the present invention provides a method for creating a cross-variation, cross-vendor view of ratings of a product. The exemplary embodiment of the present invention is driven by people recommending products they love. Shoppers can then view the recommendations and make purchase decisions in view of the recommendations for that product. In order to promote a good shopper-user experience, it is preferable that products appear only once on the exemplary website of the exemplary embodiment of the present invention. If duplicates of a product were to appear, or if variations of the same product appear separately, then a shopping user interested in evaluating the essence of a product may not find all of the recommendations about that product; rather, the shopping user would encounter, or worse, would fail to find, what might appear to the shopping user to be disparate products.

Further, it is preferable that when a shopping user wants to find a vendor that offers a product in which the shopping user is interested, that the exemplary website of the exemplary embodiment of the present invention links the shopping user to one or more vendors that offer that particular product.

It will be understood by someone with ordinary skill in the art that description herein of products is exemplary and illustrative and is not a limitation of the present invention. Rather, the present invention applies or would apply equally to non-physical elements of commerce, including such as, for example, services.

The exemplary embodiment comprises an Internet website wherein critiquing users, sometimes singularly referred to herein as a "curator," can input a critique of a product. In the exemplary embodiment, critiquing users provide positive comments about products. Therefore, the exemplary embodiment of the present invention is described herein with reference to positive selection of, and positive comments regarding, products. Positive selection of, and/or positive comments regarding, products, may sometimes be referred to herein as a "pick," a "recommendation," a "selection," a "user pick," a "user recommendation," a "user selection," a "curator pick," a "curator recommendation," a "curator selection" and/or similar terms.

It will be understood by someone with ordinary skill in the art that the description herein of an exemplary embodiment comprising an Internet website is exemplary and illustrative and is not a limitation of the present invention. Rather, the present invention could be implemented in other environments, whether now known or in the future discovered, without departing from the spirit of the invention.

Further, it will be understood by someone with ordinary skill in the art that the term "product" may mean different things to different people in different contexts. Herein, the term "product" will be used to refer to a branded good (or service), including variations of the branded good with respect to color, media and/or packaging types (e.g., paperback books, hardback books), packaging groupings (single item packaging, a package of a dozen, etc.) and other types of variations that do not merit separate critiquing, or are not features that are separately critiqued, by critiquing users. That is, an exception can be made, for example, for a non-fiction title, "Example Title" that can be found in paperback, hardback, CD, audio tape, large print, or similar variation, but for which a special leather bound edition is separately critiqued and is distinguished from the other variations of the "Example Title" as a collector's item. In such a case, the exemplary embodiment would view "Example Title" as two products—one product comprising the variations of paperback, hardback, CD, audio tape, large print, and similar variations; and a second product comprising the leather-bound edition.

It will be understood by someone with ordinary skill in the art that the description herein of positive selection of, and/or positive comments regarding, products is exemplary and illustrative, and is non-limiting. Rather, the present invention could be applied similarly to negative comments, warnings, and the like, regarding products.

An exemplary embodiment of the present invention comprises methods and computer systems for creating a cross-variation, cross-vendor view of a plurality of products. In the exemplary embodiment the exemplary computer system comprises a computer device programmed to identify a first relationship between a plurality of variations of a first particular product; and associate a first particular product identifier with the plurality of variations of the first particular product. The computer device would be further programmed to identify a second relationship between a plurality of variations of a second particular product; and associate a second particular product identifier with the plurality of variations of the second particular product. The exemplary embodiment would associate critiques input by various critiquing users regarding various variations of the first particular product with the first particular product. The exemplary embodiment would associate critiques input by various critiquing users regarding various variations of the second particular product with the second particular product. In response to a user requesting information about a variation of the first particular product, the exemplary embodiment would present a display of the critiques regarding various variations of the first particular product. In response to a user requesting information about a variation of the second particular product, the exemplary embodiment would present a display of the critiques regarding various variations of the second particular product.

BRIEF DESCRIPTION OF THE DRAWINGS

These and other features of the present invention are more fully set forth in the following description of exemplary embodiments of the invention. The description is presented with reference to the accompanying drawings in which.

DETAILED DESCRIPTION OF THE INVENTION

Figure 1A:
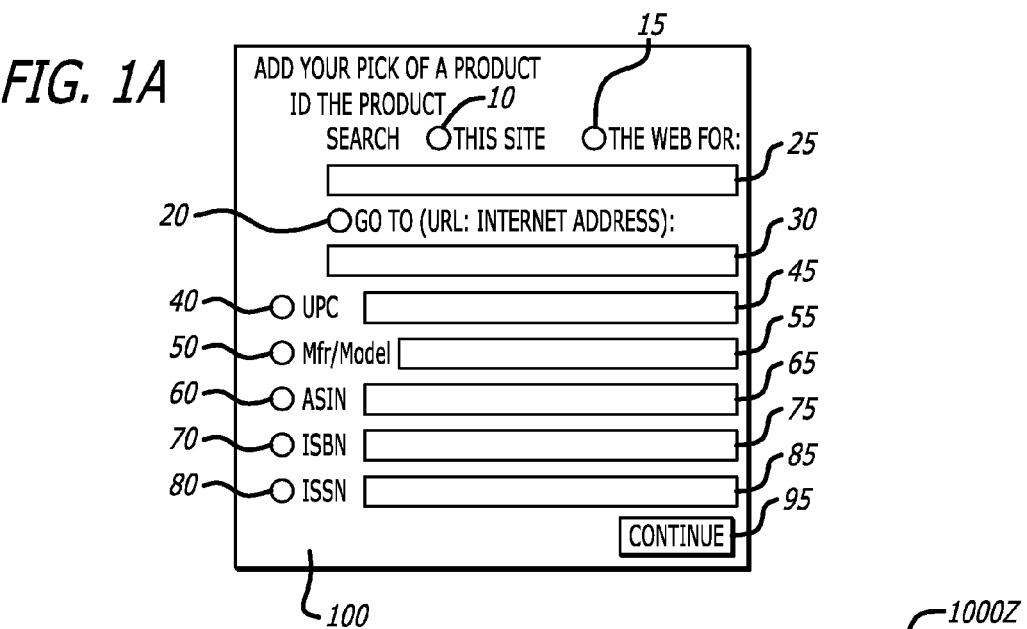
FIG. 1A depicts a graphic representation of an exemplary first critiquing user input screen in an exemplary embodiment of the present invention.

The exemplary embodiment provides an exemplary user interface by which a critiquing user can input information regarding a product. FIG. 1A depicts a graphic representation of an exemplary first critiquing user input screen 100 in an exemplary embodiment of the present invention. As depicted in FIG. 1A, the exemplary first critiquing user input screen comprises options with which a critiquing user may input an identification of a product. More specifically, as depicted in FIG. 1A, the exemplary embodiment provides an option for searching the exemplary website embodiment of the present invention 10, searching the Web 15 or inputting a specific Internet address (URL: Universal Resource Locator) 20 of a page at which the product may be found.

Figure 1B:
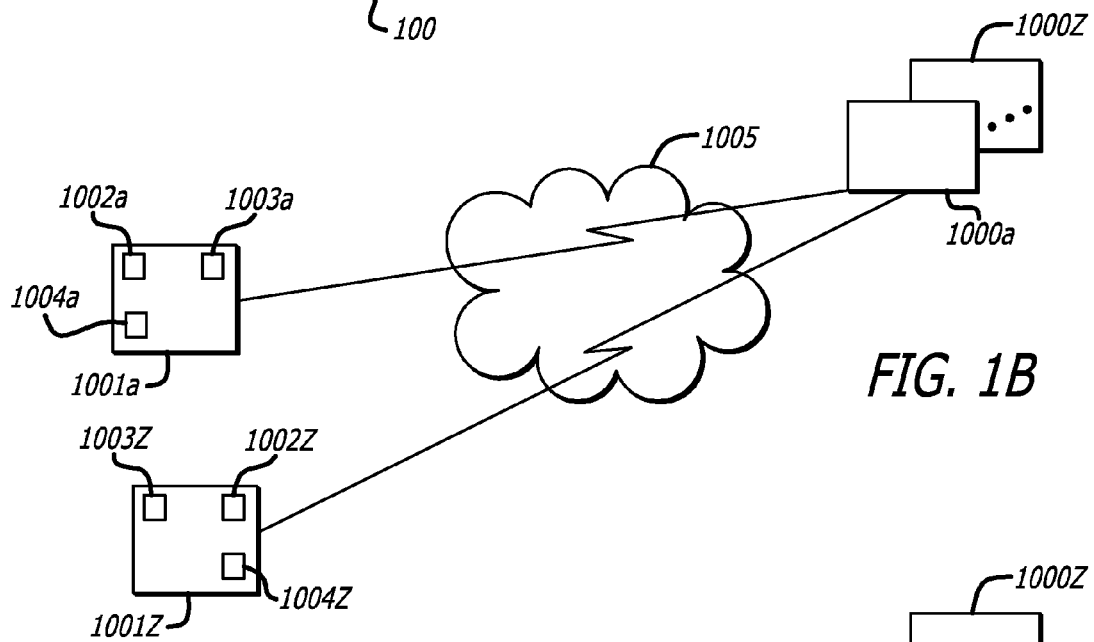
FIG. 1B is a graphic representation depicting high level exemplary relationships between exemplary server computers on which exemplary computer program instructions of the exemplary embodiment of the present invention are operable, and exemplary critiquing user computers.

FIG. 1B is a graphic representation depicting high level exemplary relationships between server computers, e.g., 1000a-1000z on which exemplary computer program instructions of the exemplary embodiment of the present invention are operable, and critiquing user computers, e.g., 1001a-1001z.

As will be understood by someone with ordinary skill in the art, each critiquing user computer device, e.g., 1001a-1001z will comprise an input device, e.g., 1002a-1002z, respectively, of a type whether now known, or in the future discovered, such as, but not limited to, a keyboard, a mouse, or the like, whether now known, or in the future discovered. An input device e.g., 1002a-1002z, may be integral to, connected to, in communication with, or otherwise configured with, the relevant critiquing user computer device, e.g., 1001a-1001z.

Further, each critiquing user computer device, e.g., 1001a-1001z, will comprise a display device, e.g., 1003a-1003z, respectively, of a type whether now known, or in the future discovered, such as, but not limited to, for example, a display monitor. A display device, e.g., 1003a-1003z, may be integral to, connected to, in communication with, or otherwise configured with, the relevant client computer device, e.g., 1001a-1001z.

It should be noted that the use of suffixes such as "a" through "z" in connection with numbered elements of the FIGURES herein are exemplary and are not a limitation of the invention to any particular number. Rather, the suffixes "a" through "z", and similar notations, may be used herein to represent the potential of an unknown plurality of similar elements.

Critiquing user computers, e.g., 1001a-1001z may communicate with server computers, e.g., 1000a-1000z via a communications network, such as the Internet 1005.

Critiquing user computers, e.g., 1001a-1001z may access server computers, e.g., 1000a-1000z via a communications network, such as, for example, the Internet 1005, using web browser software, e.g., 1004a-1004z that may reside on, and be executed by, the relevant critiquing user computer, e.g., 1001a-1001z.

As will be understood by someone with ordinary skill in the art, web browser software is a computer program, or a set of computer instructions, that allows a client computer to retrieve and render hyper-media content from one or more Server computers, such as over the Internet. Commercially available web browsers include, but are not limited to, for example, NETSCAPE'S NAVIGATOR™ and MICROSOFT'S INTERNET EXPLORER™. The mention herein of a particular web browser is not a limitation of the present invention. Other browser software, or other computer instructions, whether now known or in the future discovered, that are adapted for retrieving and rendering hyper-media content, or other content media, whether now known or in the future discovered, from one or more server computers, such as over the Internet, may be used without departing from the spirit of the present invention.

Reference herein to a user interface screen, or a graphical user interface screen, or a web page of the exemplary embodiment, will be understood to be a reference to the exemplary embodiment presenting a web page to the browser software, e.g., 1004a-1004z that may reside on, and be executed by, the relevant critiquing user computer device, e.g., 1001a-1001z of a critiquing user for display on the display device, e.g., 1003a-1003z, for the relevant client computer device, e.g., 1001a-1001z.

Figure 1C:
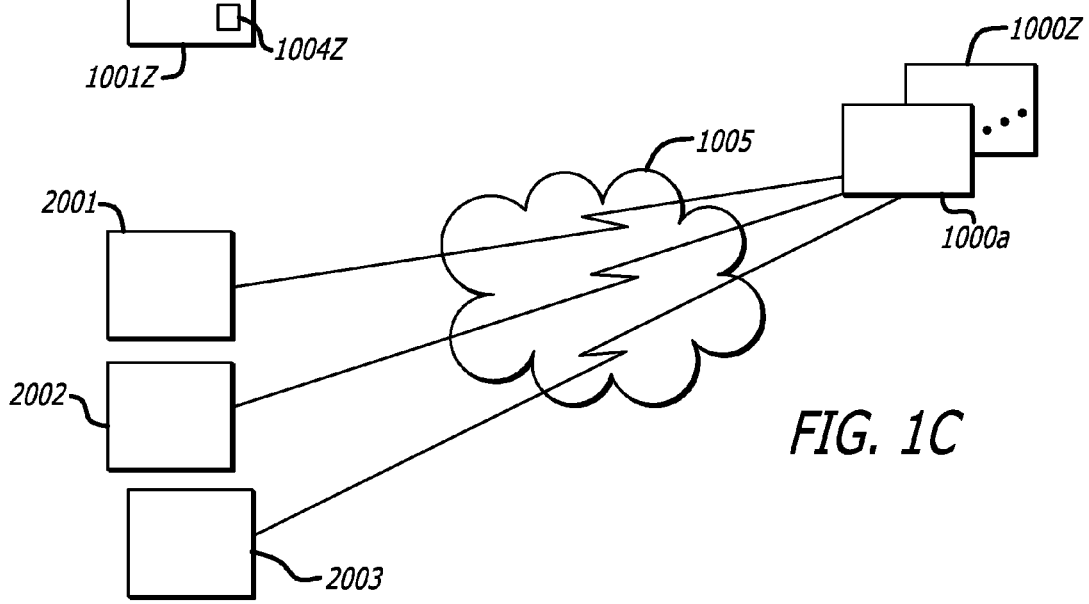
FIG. 1C is a graphic representation depicting high level exemplary relationships between exemplary server computers on which exemplary computer program instructions of the exemplary embodiment of the present invention are operable, and an exemplary plurality of exemplary server computers that each host respective exemplary websites related to respective exemplary products.

FIG. 1C is a graphic representation depicting high level exemplary relationships between exemplary server computers, e.g., 1000a-1000z on which exemplary computer program instructions of the exemplary embodiment of the present invention are operable, and an exemplary plurality of exemplary server computers 2001, 2002, 2003 that each host respective exemplary websites related to respective exemplary products. References herein to an exemplary embodiment of the present invention retrieving a web page from a website will be understood by someone with ordinary skill in the art to refer to an access by the relevant exemplary embodiment via a communications network such as, e.g., the Internet 1005, to the relevant exemplary server computer, e.g., 2001, 2002, 2003 or the like.

It will be understood by someone with ordinary skill in the art that the above-given description of critiquing user computers, e.g., 1001a-1001z communicating with server computers, e.g., 1000a-1000z on which exemplary computer program instructions of the exemplary embodiment of the present invention are operable, is exemplary and illustrative. In alternative embodiments, critiquing user computers, e.g., 1001a-1001z, could be client computers on which client software would be operable with some portion of the features of the present invention.

Returning with reference to FIG. 1A, if a user chooses one of the search options 10 or 15, the user may input into a search input field 25 a search term, such as, for example, a product name, a UPC (Universal Product Code) code, a Manufacturer name and model number, an ISBN (International Standard Book Number), an ISSN (International Standard Serial Number (used for magazines)), a label/catalog number (used for records), or other search term.

Alternatively, if a user chooses one of the search options 10 or 15, the user may input a search term of a particular type into one of the product identifier search term input fields (45, 55, 65, 75, and 85) and by clicking the corresponding search term type indicator (40, 50, 60, 70, or 80, respectively) as discussed further below.

More specifically, the exemplary first critiquing user input screen 100 depicted in FIG. 1A provides an UPC (Universal Product Code) search term type indicator 40 and a corresponding UPC product identifier search term input field 45; a manufacturer/model number search term type indicator 50 and a corresponding manufacturer/model number product identifier search term input field 55; an ASIN search term type indicator 60 (an ASIN is an SKU-like product item identifier used by AMAZON® and used by many vendors that are referenced by AMAZON®'s online marketplace) and a corresponding ASIN product identifier search term input field 65; an ISBN (International Standard Book Number) search term type indicator 70 and a corresponding ISBN product identifier search term input field 75; and an ISSN (International Standard Serial Number—used for magazines) search term type indicator 80 and a corresponding ISSN product identifier search term input field 85. It will be understood by someone with ordinary skill in the art that the above-listed product identification options and corresponding input fields are exemplary and not a limitation of the invention; other types of search term type indicators and product identifier search term input fields could be provided without departing from the spirit of the present invention.

Alternatively, if the critiquing user chooses option 20 to enter a particular URL/Internet Address, the critiquing user would enter a URL in URL input field 30.

Once the critiquing user has entered a search term (in input field 25) and designated a search option (selecting one of exemplary indicators 10 or 15), or has designated the "Go to" option (indicator 20) and has entered a URL (in input field 30), the critiquing user would click on the "Continue" button 95 to signal the exemplary system to proceed.

If the critiquing user entered a search term (in input field 25) and designated the "search the Web" option (indicator 15), then the exemplary embodiment of the present invention would provide the user-entered search term to a YAHOO!® search API (Application Programmer Interface) command to search the Web for the search term. A search of the Web would then be conducted and a listing of matches with the search term returned by the search would be provided.

Figure 2:
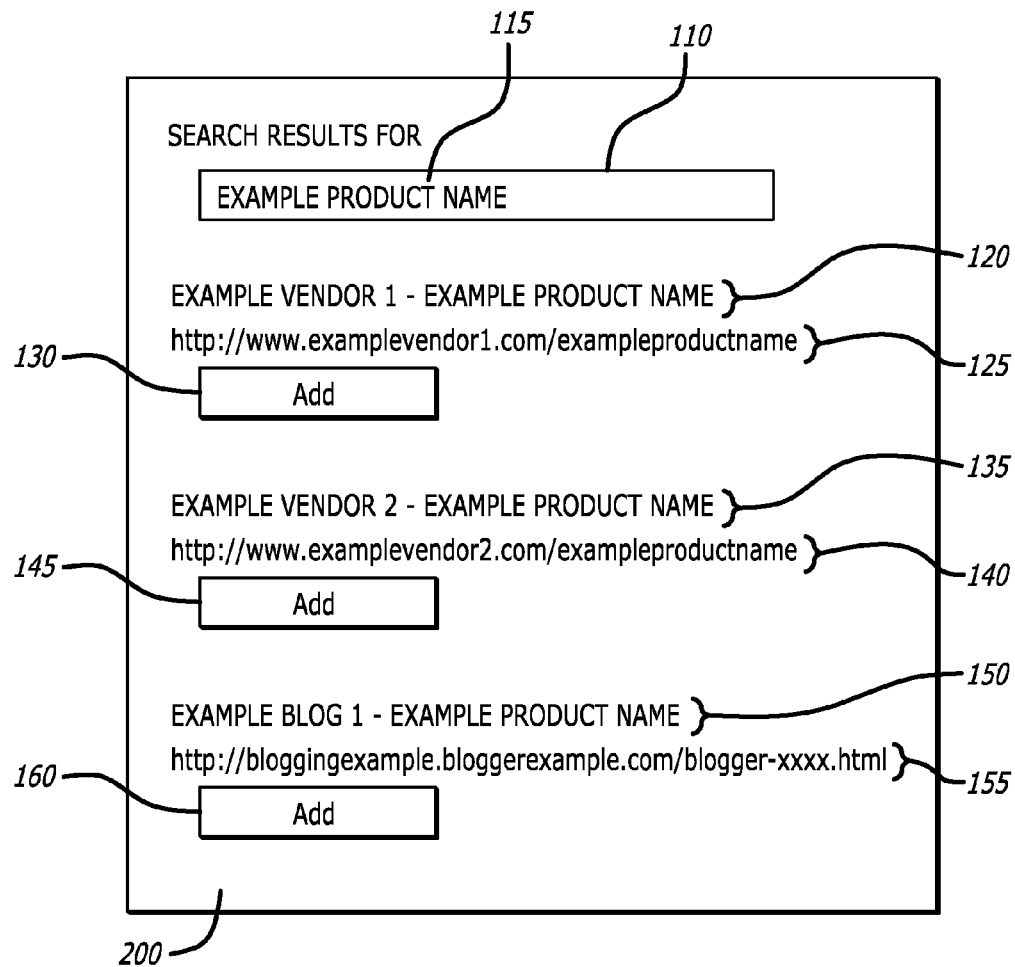
FIG. 2 depicts a graphic representation of an exemplary Search Results screen in an exemplary embodiment of the present application.

FIG. 2 depicts a graphic representation of an exemplary Search Results screen 200 in an exemplary embodiment of the present application. FIG. 2 further depicts an exemplary set of search results returned for an exemplary search term 115 (comprising an exemplary product name 115 displayed in an exemplary search term field 110). The exemplary set of search results includes three sets of search result listings (e.g., exemplary search listing sets 120-130, 135-145, and 150-160). Each set of search result listings comprises a title (e.g., exemplary titles 120, 135, and 150 respectively) of a search result match, a link to an Internet address, e.g., a URL (e.g., exemplary URL links 125, 140 and 155 respectively) at which a match with the search term was found by the search, and an "Add" button (e.g., exemplary "Add" buttons 130, 145, and 160 respectively) that if clicked, would cause the exemplary embodiment to analyze the to-be-added URL.

Figure 3:
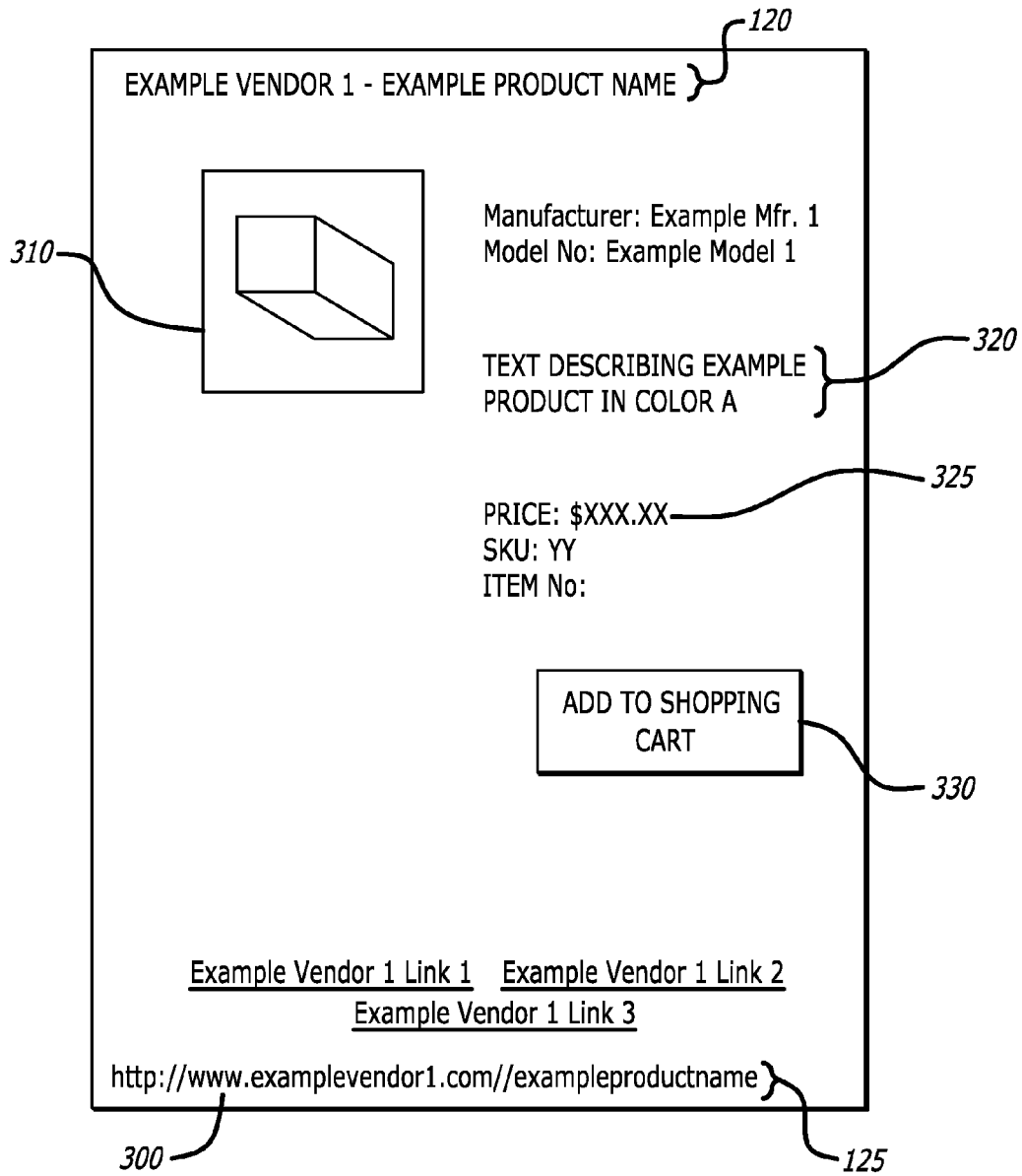
FIG. 3 is a graphic depiction of an exemplary web page located at an exemplary Internet URL.
Figure 6A:
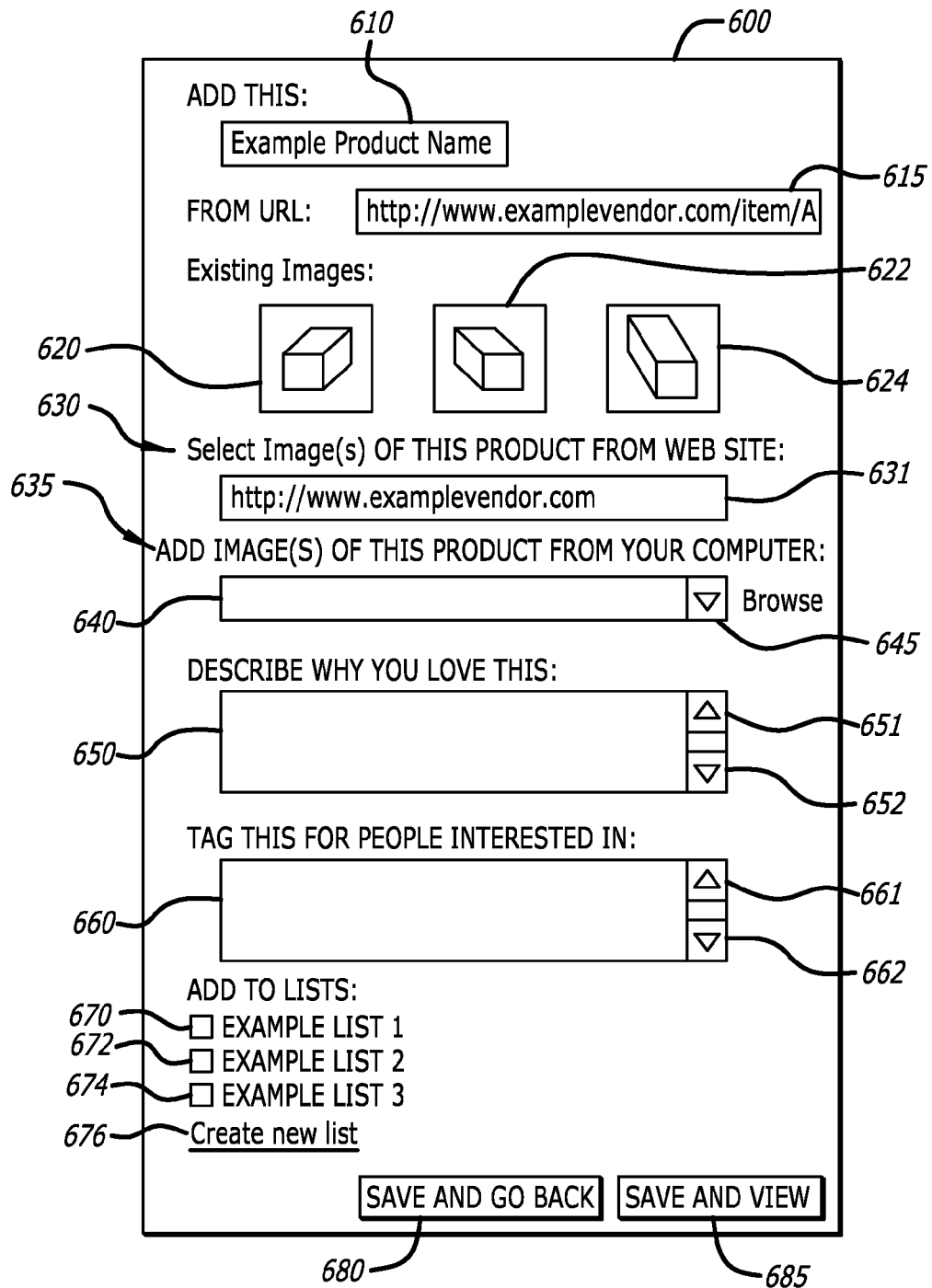
FIGS. 6A and 6B are graphic depictions of results selected for viewing by a critiquing user from an exemplary Search Results screen in an exemplary embodiment of the present invention.
Figure 6B:
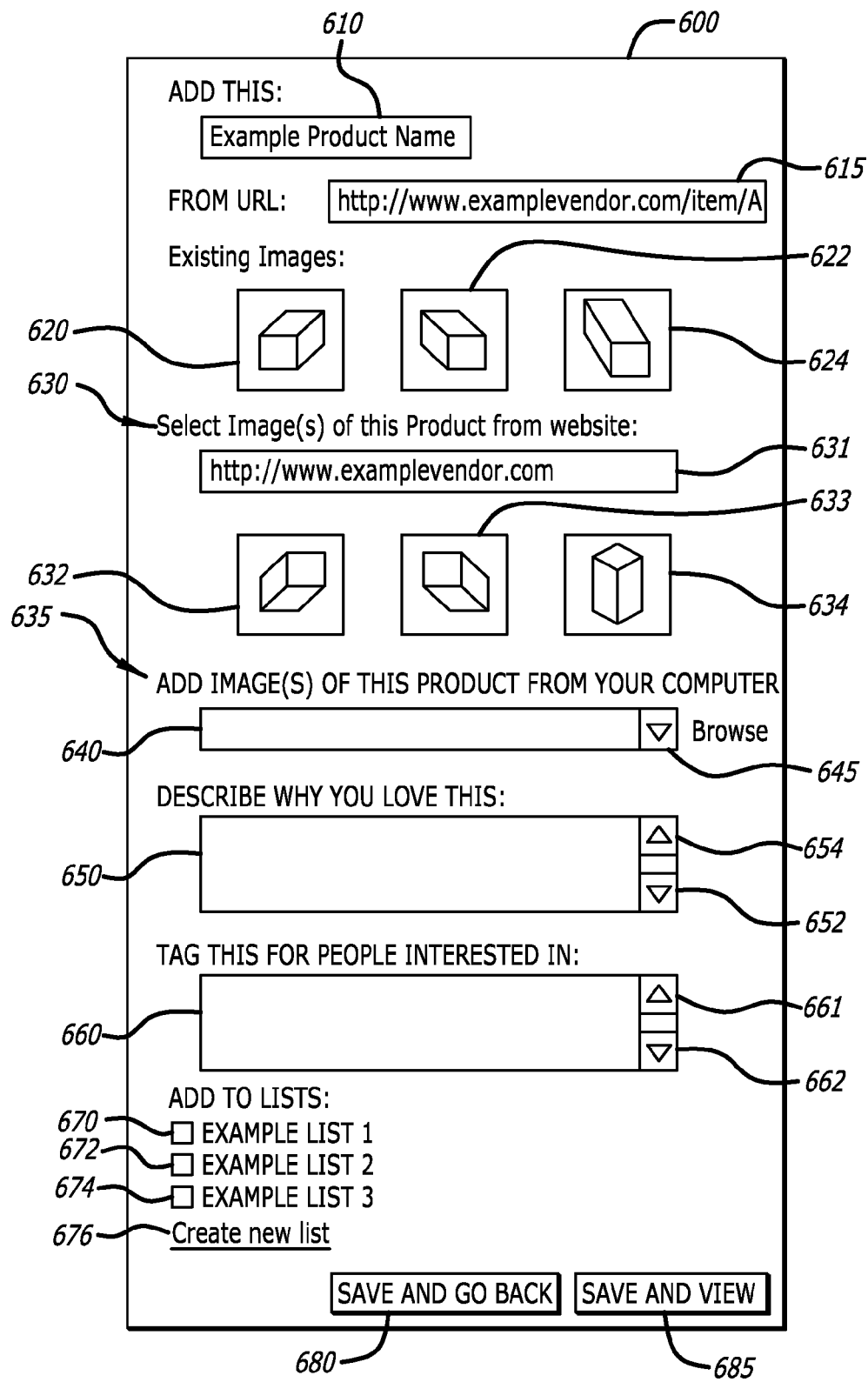

In the exemplary embodiment, a critiquing user would have the opportunity to click on any of the add buttons (e.g., exemplary buttons 130, 145 and 160 respectively) presented by the Search Results screen 200. If a critiquing user clicks on one of the add buttons, e.g.; exemplary add button 125, the exemplary embodiment would analyze the web page located at the exemplary URL identified in the exemplary URL link, e.g., exemplary URL link 125. Once the system has analyzed the web page located at the exemplary URL identified in the exemplary URL link, e.g., exemplary URL link 125, the critiquing user would have the opportunity to evaluate the image of the product that the user wants to critique that is found there. FIG. 3 is a graphic depiction of an exemplary web page located at an exemplary Internet URL and FIGS. 6A and 6B are graphic depictions of the results selected for viewing by a critiquing user from the exemplary Search Results screen 200 as was depicted in FIG. 2.

If the critiquing user wants to return to the Search Results screen 200 depicted in FIG. 2, the critiquing user could simply use the "Back" button on the critiquing user's web browser.

When a critiquing user clicks an "Add" button (e.g., Add button 130, 145, or 160 as depicted in FIG. 2) to add a URL link reference to be associated with a critique of a product, the exemplary embodiment of the present invention then analyzes the to-be-added URL as further described below. One exemplary reason for analyzing the to-be-added URL is to determine whether the URL has been previously added to an exemplary URL database provided by the exemplary embodiment of the present invention. If the to-be-added URL has been previously added, a duplicate entry is not added. Another exemplary reason for analyzing the to-be-added URL is to determine any association with existing URL entries in the URL database. Determining associations of URL's for variations of a product is used by the exemplary embodiment to provide a broader product view of ratings on the exemplary embodiment website.

It will, be further understood by someone with ordinary skill in the art that the exemplary embodiment would provide additional ways in which to identify a product. For example, the exemplary embodiment of the present invention would provide software that would be downloadable by critiquing users to facilitate the critiquing users designating a "bookmarklet" to a webpage, such as, for example, to a vendor website, that the critiquing user is viewing. For example, the exemplary embodiment of the present invention would provide a user interface option (not shown, but, for example, an icon or tab on any one of many pages within the exemplary website of the exemplary embodiment of the present invention) for a critiquing user to download exemplary "bookmarklet" software appropriate for the user's browser software. Downloading and installing the exemplary "bookmarklet" software installs an exemplary option on a tool bar of the critiquing user's browser. Once a critiquing user has installed the "bookmarklet" software, when the critiquing user is viewing a vendors site, when the critiquing user views a webpage describing a product that the critiquing user would like to critique using the exemplary website of the exemplary embodiment of the present invention, the critiquing user would click the "bookmarklet" option on the critiquing user's browser's toolbar. Doing so would designate the webpage being viewed as a page to be added and would navigate the critiquing user to the exemplary "Add This" user interface 600 depicted in FIGS. 6A and 6B, which will be described further below.

Before displaying the exemplary "Add This" user interface 600 depicted, for example, in FIG. 6A, the exemplary embodiment of the present invention analyzes the product identification provided by the critiquing user as will be described in more detail below in order to determine whether or not the item that the critiquing user has identified is a variation of one or more items for which critiques have previously been provided to the exemplary website of the exemplary embodiment (sometimes referred to herein as a "known" item, or in the case of a product, a "known" product, or in the case of a URL, a "known" URL); if the exemplary embodiment determines that the item that the critiquing user has identified is a variation of one or more items for which critiques have previously been provided, then the exemplary embodiment will bundle the item identified, and the corresponding critique provided, by the critiquing user with the previously critiqued items. Doing so will provide a broader product view for shopping users that view the bundled items and corresponding critiques.

Figure 4:
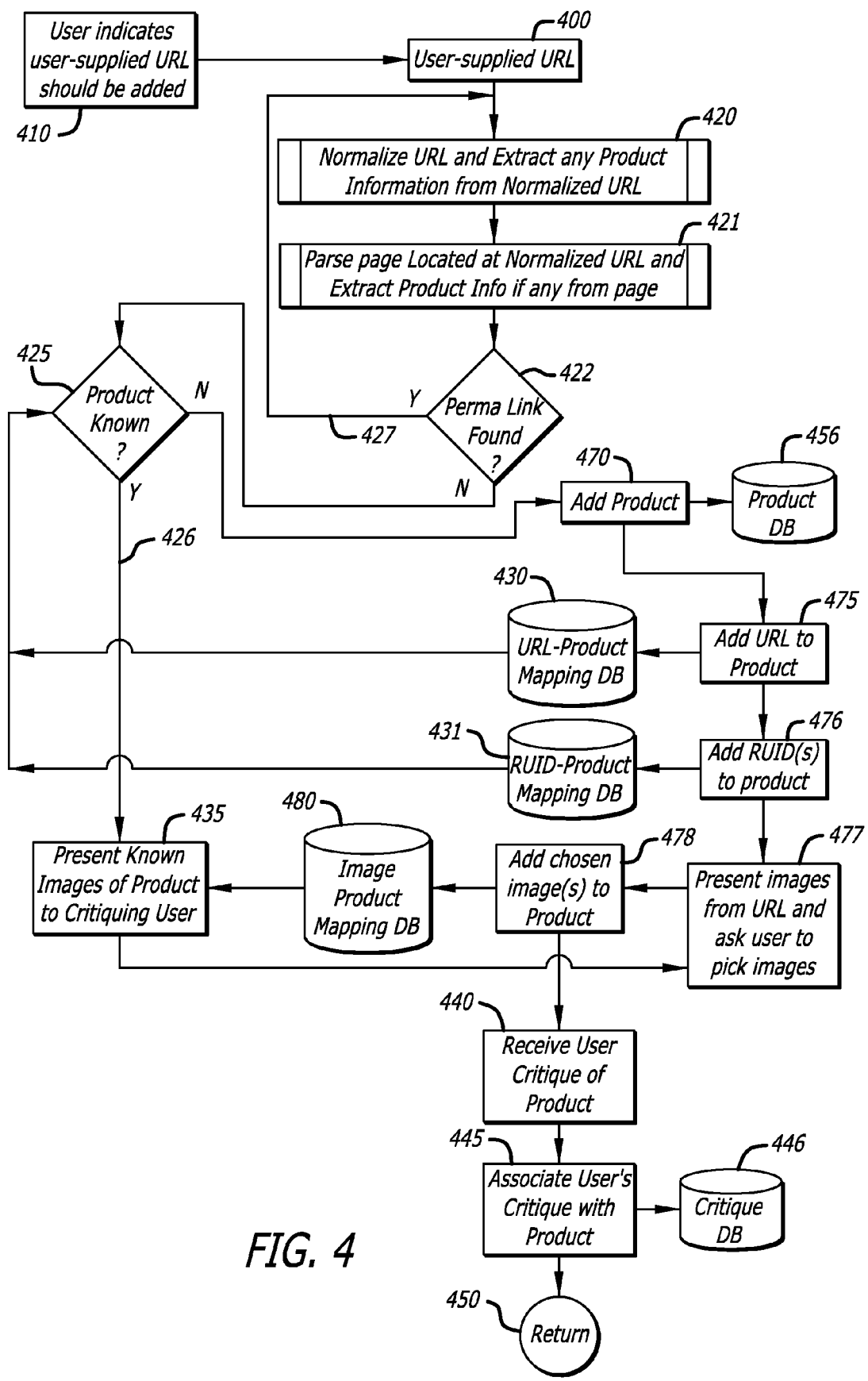
FIG. 4 is a high-level flow diagram depicting high-level logic functions in an exemplary analysis process of analyzing a to-be-added URL.

FIG. 4 is a high-level flow diagram depicting high-level logic functions in an exemplary analysis process of analyzing a to-be-added URL. In the exemplary embodiment, as shown in FIG. 4, a user indicates in process 410 that a particular user-supplied URL 400 is to be added. As described above, the exemplary embodiment would analyze a URL to be added in any one of a plurality of circumstances. For example, the exemplary embodiment would analyze a URL to be added in the case that a critiquing user input a URL, such as by indicating the "Go To" option 20 and inputting a URL in the URL input field 30 as depicted in FIG. 1A. As another example, the exemplary embodiment would analyze a URL to be added in the case that a critiquing user chose the Search the Web option 15 and input a search term in input field 25, and then, clicked an "Add" button (e.g., exemplary Add buttons 130, 145 or 160 as depicted in FIG. 2) on the exemplary "Search Results" screen 200 as depicted in FIG. 2. As yet another example, the exemplary embodiment would analyze a URL to be added in the case that a critiquing user clicked the "bookmarklet" option while viewing a webpage in a third-party website.

With reference to FIG. 4, in analyzing a to-be-added URL, the exemplary embodiment of the present invention would execute exemplary process 420 to normalize a user-supplied URL. The exemplary normalization process 420 "normalizes" the to-be-added URL to its most elemental, canonical form and extracts product identification information from the URL if any is available.

It will be understood by someone with ordinary skill in the art that description herein of a normalized URL, or a reference to a URL in its most elemental, canonical form, is a reference to an exemplary interpretation of what comprises a URL's most elemental, canonical form. Other interpretations of what comprises a URL's most elemental, canonical form could be used in alternative embodiments without departing from the spirit of the present invention. Even within the exemplary embodiment, normalization of URLs may evolve and change over time as vendors change their websites.

As an illustrative, but non-limiting example of the exemplary normalization process, in the case of some URLs, the exemplary normalizing process 420 will eliminate non-essential elements of a URL. For example, it will be understood by someone with ordinary skill in the art that some websites assign what can be described as a view-specific session identifier to a URL that is displayed by the viewer's browser.

Therefore, a first viewer that navigates to a particular exemplary webpage at the example website www.example.com could see the following first viewer/view-specific URL:

http://www.example.com/view/?sessionid=ABCD&id=23

A second viewer that navigates to the same particular exemplary webpage at the example website www.example.com could see the following second viewer/view-specific URL:

http://www.example.com/view/?sessionid=EFGH&id=23

The exemplary embodiment is programmed to normalize, as depicted in process 420, the two above-given exemplary viewer-specific URL views of the same webpage to reduce the two URL's to their most elemental, canonical form as follows:

http://www.example.com/view?id=23

It will be understood by someone with ordinary skill in the art that if the two above-given exemplary viewer-specific URL views of the same webpage were not normalized to reduce the two URLs to their most elemental, canonical form, then critiques by the two respective critiquing users regarding each URL would appear to pertain to two different products, when instead, the two respective critiques concern the same product. By normalizing the two URL's, the critiques that will be given by the two respective critiquing users can be bundled together to provide a cohesive "product view" to shopping users.

It will be understood by someone with ordinary skill in the art that many domain operators/vendors use one of many types of "store software" for engaging in electronic commerce; each type of "store software" uses its own approach to, among other things, presenting URL's of respective webpages to viewers. One exemplary embodiment of the present invention will be programmed to recognize the type of "store software" used by a particular vendor/domain name in order to recognize various patterns of URL's, normalize URL's from the respective vendors/domains, and extract product identification information from the URL's and/or extract product information and/or images from the location addressed by the URL's.

Notwithstanding the various program processes outlined below, human editors may periodically review content of the exemplary website of the exemplary embodiment of the present invention to identify "duplicate" occurrences of a single product; human editors may periodically review reports produced by the exemplary website of the exemplary embodiment of the present invention to identify "duplicate" occurrences of a single product. The human editors will investigate duplicates to determine whether a domain/vendor is using a method for presenting URLs and/or product identification, product information and/or images that requires "store software" not previously known to the exemplary system, a URL pattern not previously recognized by the system, or some special handling. In the event that such previously unknown "store software," unrecognized method, etc. is identified, the human editors will determine a pattern and/or will implement program code for special handling rules for normalizing user-supplied URL's to the most elemental, canonical URL for the corresponding domain name/vendor, for extracting product identification information, and/or for other special processing.

In one embodiment, URL normalization patterns and information extraction patterns are recorded in a database, sometimes referred to herein as the "URL normalization database," for each domain name/vendor.

In another embodiment, domain names/vendors that use one of a certain set of standard methods for representing viewer URL's would not be separately entered in the URL normalization pattern database.

It will be understood by someone with ordinary skill in the art that reference herein to the term "database" or "data base" is not a limitation of the invention. It will be understood by someone with ordinary skill in the art that reference herein to data being kept on a "database" applies as well to data kept in a memory (the type of which may now be known or in the future discovered) that is accessible by a computer, such as, for example, in a table.

Figure 5A:
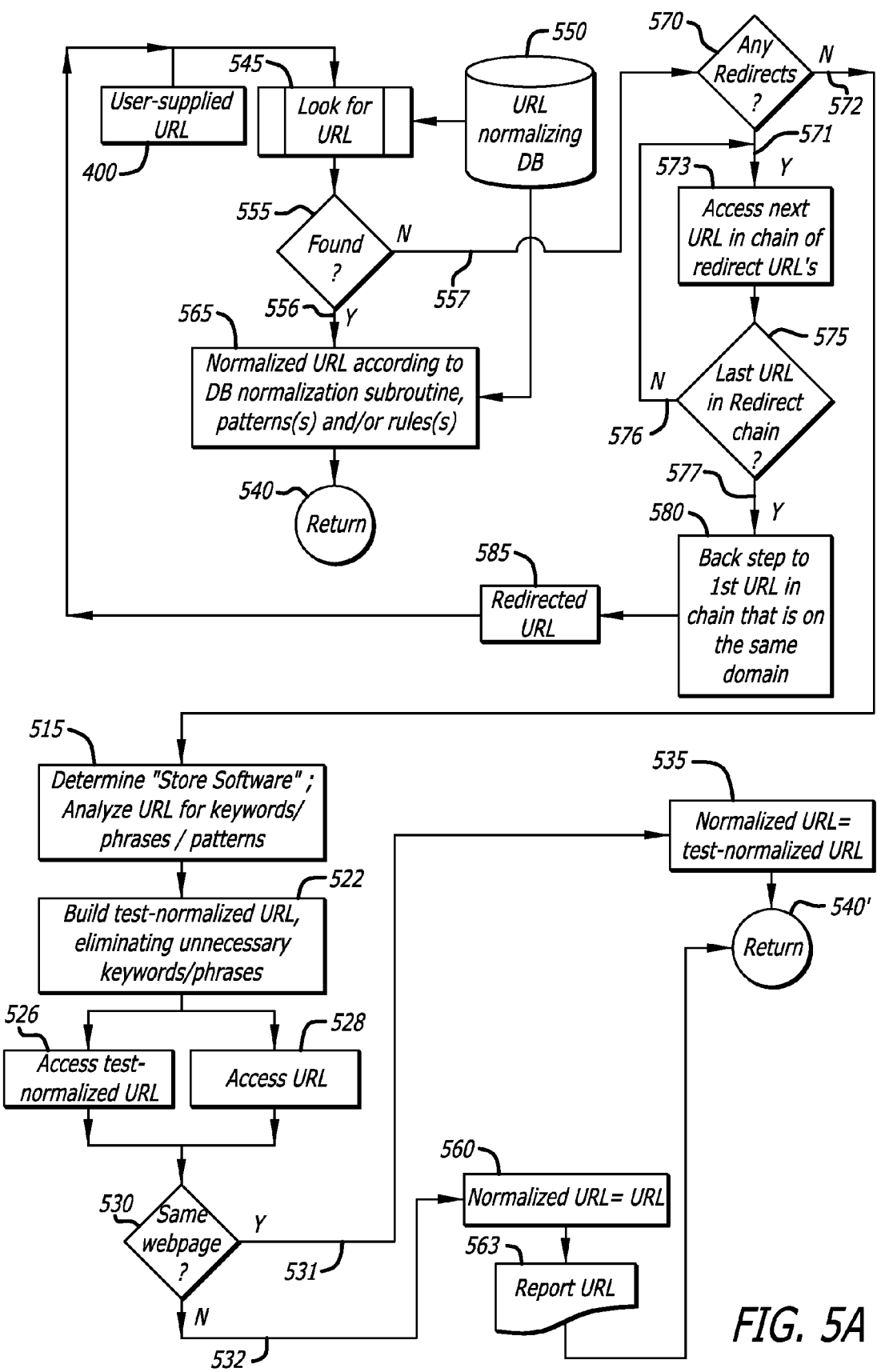
FIG. 5A is a high-level flow diagram depicting high-level logic functions of an exemplary normalization process in the exemplary embodiment of the present invention.

FIG. 5A is a high-level flow diagram depicting high-level logic functions of an exemplary normalization process (e.g., element 420 depicted in FIG. 4) in the exemplary embodiment of the present invention. In the exemplary normalization process depicted in FIG. 5A, each user-supplied URL 400 would be provided to exemplary process 545. Exemplary process 545 would look for the domain name of the URL provided to it in an exemplary URL normalization database 550.

Figure 5B:
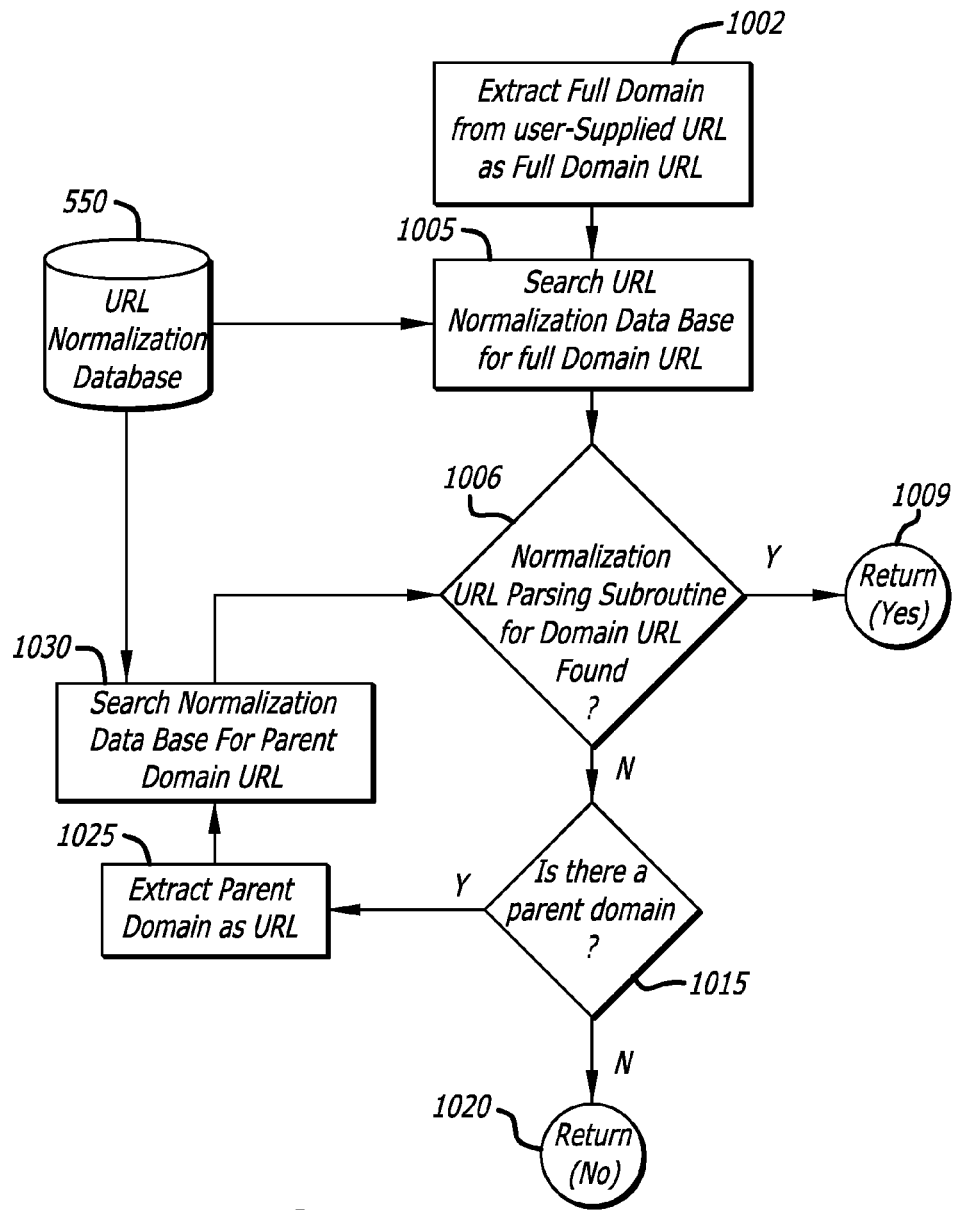
FIG. 5B is a high-level flow diagram depicting high-level logic functions of an exemplary URL look-up process in the exemplary embodiment of the present invention.

FIG. 5B is a high-level flow diagram depicting high-level logic functions of an exemplary URL look-up process (e.g., element 545 depicted in FIG. 5A) in the exemplary embodiment of the present invention. As depicted in FIG. 5B, the exemplary URL look-up process (e.g., element 545 depicted in FIG. 5A) would comprise an exemplary URL extraction process 1002. Exemplary URL extraction process 1002 would comprise extracting a full domain name from the user-supplied URL.

Continuing with reference to FIG. 5B, the full domain name would then be passed as the URL to an exemplary URL search process 1005. Exemplary URL search process 1005 would comprise accessing exemplary URL normalization data base 550 (the phrase "data base" or "database", is sometimes abbreviated herein as "DB"), and searching exemplary URL normalization data base 550 for the full domain name of the URL. It will be understood by someone with ordinary skill in the art that the full domain name of a URL is not necessarily a complete URL. However, for purposes of reference, the full domain name of a URL is sometimes referred to herein as a "full domain name URL" or as a "domain name."

In the exemplary embodiment, exemplary URL normalization data base 550 would comprise a plurality of normalization records. In the exemplary embodiment, each normalization record in the exemplary URL normalization data base 550 would comprise, for example, the domain name to which to apply normalization rules, and the means or rules for normalization. In the exemplary embodiment, each normalization record for a particular domain name, or full domain name URL, would comprise an indication of a name of a normalization parsing subroutine. In the exemplary embodiment, each normalization parsing subroutine would comprise computer instructions for normalizing the user-supplied URL and extracting any product information from the URL that the URL may provide.

With reference to FIG. 5B, in exemplary URL search results test process 1006, the results of the search conducted in exemplary URL search process 1005 would then be evaluated. If, in exemplary URL search results test process 1006, it is determined that a URL entry with a name of a normalization parsing subroutine was found, then processing control would return at return process 1009 to the calling process, e.g., exemplary URL look-up process 545 depicted in FIG. 5A; the URL and the name of the corresponding normalization parsing subroutine name would be returned.

If, on the other hand, in exemplary URL search results test process 1006, it is determined that no name of a normalization parsing subroutine was found, then in exemplary parent domain test process 1015, it is determined whether there is a parent domain associated with the full domain URL for which the URL normalization data base 550 was searched. If there is no parent domain, then processing control would return at return process 1020 to the calling process, e.g., exemplary URL look-up process 545 depicted in FIG. 5A with an indication that no normalization/parsing subroutine name was found.

If, on the other hand, in exemplary parent domain test process 1015, it is determined that a parent domain exists that is associated with the full domain URL, then in exemplary process 1025, the parent domain is extracted as the parent domain URL; and then in exemplary process 1030, the URL normalization data base 550 is searched and the exemplary URL search results test process 1006 would again be executed to determine whether a URL entry, this time for the parent domain, had been found with a name of a normalization parsing subroutine. If exemplary URL search results test process 1006 found that a name of a normalization parsing subroutine, this time for the parent domain URL, then processing control would return at return process 1009 to the calling process, e.g., exemplary URL look-up process 545 depicted in FIG. 5A; the parent domain URL and the name of the corresponding normalization parsing subroutine name would be returned.

Returning with reference to FIG. 5A, if, in exemplary test process 555, it is determined that a match, including a subroutine name, had been found on the exemplary URL normalization database 550, then the "yes" path 556 would be taken to proceed to exemplary normalization subroutine execution process 565.

In exemplary process 565, the URL would be normalized according to normalization pattern(s) and/or rules comprising computer program instructions in an exemplary URL-specific URL normalization subroutine with a name as was found on the exemplary URL normalization database 550 for the URL. In the exemplary embodiment, URL pattern templates may be provided in a URL normalization subroutine named in the exemplary URL normalization database 550 depicted, for example, in FIG. 5A, or could alternatively, for example, be provided in an exemplary URL template pattern database (not separately depicted).

It will be understood by someone with ordinary skill in the art that in order to create URL pattern templates, one of many available pattern languages could be used. In the exemplary embodiment, a pattern-matching language, such as for example, PERL regular expressions, is used to express respective patterns for respective URLs.

It will be understood by someone with ordinary skill in the art that the description herein of use of PERL regular expressions is exemplary and non-limiting. Other pattern languages, whether now known or in the future discovered, could be used without departing from the spirit of the present invention. For example, GEMA, or XPOP, or some combination could be used to normalize URLs. Alternatively, various conditional testing could be done instead of using any specific pattern language.

Figure 8:
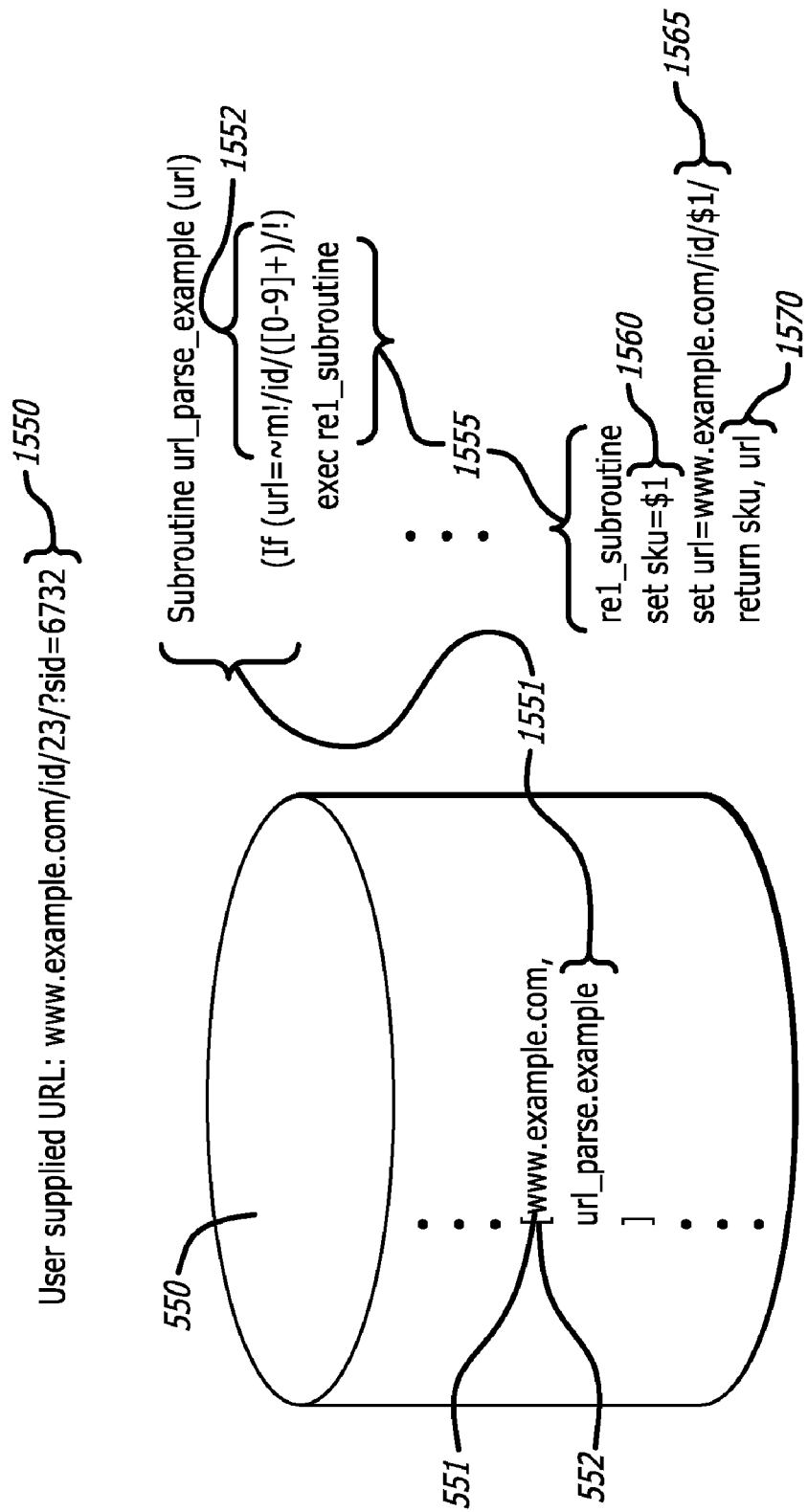
FIG. 8 is a graphic representation depicting logical relationships between an exemplary user-supplied URL, a record on an exemplary URL normalization data base for a corresponding exemplary full domain URL, an exemplary URL parsing subroutine, and an exemplary PERL real expressions pattern template subroutine in an exemplary embodiment of the present invention.

FIG. 8 is a graphic representation depicting logical relationships between an exemplary user-supplied URL 1550, a record 551 on an exemplary URL normalization data base for a corresponding exemplary full domain URL (discussed above with respect to FIG. 5B), an exemplary URL parsing subroutine 1551, and an exemplary PERL regular expressions pattern template subroutine 1555 in an exemplary embodiment of the present invention.

With reference to FIG. 8, in the exemplary embodiment, a full domain URL for exemplary user-supplied URL 1550 comprising "www.example.com/id/23/?sid_6732" would be extracted as "www.example.com" 551. In the exemplary embodiment, the exemplary full domain URL 551 would be used to search exemplary URL Normalization data base 550. If a record 552 is found on exemplary URL Normalization data base 550 for exemplary full domain URL 551, the exemplary corresponding URL parsing subroutine name 1551 would be used to execute the corresponding exemplary URL parsing subroutine 1551.

Exemplary URL parsing subroutine 1551 comprises computer instructions that would test the user-supplied URL with various PERL regular expressions, e.g., 1552. If a pattern match between the user-supplied URL and a PERL regular expression is found, then a corresponding exemplary extraction and normalization subroutine, e.g., re1_subroutine 1555, would be performed.

In particular, in the illustrative example depicted in FIG. 8, a pattern match would be found between the "/id/23/" portion of the user-supplied URL and the exemplary PERL regular expression 1552 "m!/id/([0-9]+)/!". A pattern match having been found, the corresponding exemplary extraction and normalization subroutine, e.g., re1_subroutine 1555, would be performed.

Exemplary extraction and normalization subroutine re1_subroutine 1555 comprises exemplary sku extraction instruction 1560 that sets the value for the vendor-specific to the number found in the "[0-9]+" portion of the user-supplied URL 1550, which, in the exemplary case, is the number "23." Exemplary extraction and normalization subroutine re1_subroutine 1555 further comprises exemplary URL normalization instruction 1565 that sets the URL to "www.example.com/id/$1/", where the $1 variable represents the SKU, which has been set to "23."

It will be understood by someone with ordinary skill in the art that the above-described example is illustrative and non-limiting. Various URL patterns or templates would be provided in an exemplary embodiment. Alternatively, or in addition, various conditional logic would be programmed to translate the content of a user-supplied URL and to extract information from it, and normalize it. Further, various types of pattern templates that could include various types of information, could be used.

In the exemplary embodiment, a domain level URL pattern or subroutine would be provided for each known domain level URL. Alternatively, in the event that special handling was required for parsing information from a particular vendor/URL, the exemplary embodiment would be programmed to provide special handling for that URL.

Returning with reference to FIG. 5A, once the exemplary normalization subroutine execution process 565 was completed, processing control would return at return process 540 to the calling process, e.g., exemplary normalization process 420 depicted in FIG. 4; the normalized URL would be returned.

It will be understood by someone with ordinary skill in the art that the above-described exemplary normalization process and exemplary normalization data base are illustrative. Alternative ways for structuring a normalization data base could be used without departing form the spirit of the invention. For example, an alternative embodiment of a normalization data base could be structured so that instead of a URL record or entry indicating a name of a subroutine, the code for normalization could itself be contained in the relevant URL record or entry.

Further, it will be understood by someone with ordinary skill in the art that the logic flow diagrams presented herewith depict exemplary high level logic functions. Alternative embodiments could structure the flow of logic functions differently without departing from the spirit of the present invention.

With reference to FIG. 5A, if, on the other hand, according to exemplary test function 555, no normalization subroutine name for a corresponding URL was found on the exemplary URL normalization database 550, then the "no" path 557 would be taken to proceed to exemplary test function 570. If, according to exemplary test function 570, any "redirects" were identified, then the "yes" path 571 would be taken to proceed to exemplary process 573 to access each successive URL in a chain of redirects.

Before proceeding with the description of the processes involved in following a chain of redirects, a general overview of redirects, and circumstances that sometimes involve redirects, is discussed below.

It will be understood by someone with ordinary skill in the art that "redirects" are circumstances where a URL points to an address at which another URL is found. That is, instead of a URL pointing to an address at which the content of a webpage is found, the URL points to an address at which the content is an instruction to retrieve yet another URL.

One set of circumstances in which redirects are common involve the Internet infrastructure used to provide "affiliate revenue." Affiliate revenue is available to a website that acts as an Internet "middleman." An exemplary affiliate revenue program might offer some percentage, for example, x %, of the amount a customer purchases from a website to which the affiliate has sent them. For example, if website www.example1.com contains a link to www.example2.com, if there is an affiliate agreement between the two websites, then if a user of website www.example1.com were to click on the link to www.example2.com, and if the user then buys something on the www.example2.com website, then www.example2.com would pay the affiliate, www.example1.com, x % of the revenue.

In order to track affiliate links, click throughs and revenues, affiliates may use an affiliate tracking service, such as, for example, www.linksynergy.com. When a user on an affiliate clicks a link to a vendor, instead of proceeding directly to that vendor, www.linksynergy.com intercepts the user's attempted access of, e.g., the www.example2.com vendor site and supplies the user with a masked URL, such as, for example, www.linksynergy.com/A.

If the URL www.linksynergy.com/A is provided to the exemplary embodiment of the present invention, there is no webpage found at the given URL. Because there is no webpage found at the given URL, the exemplary embodiment of the present invention would not be able to extract any product identification information or any product image from the html page at which the given URL points.

Therefore, the exemplary embodiment of the present invention would access the given URL, and if a redirect URL were found, then the exemplary embodiment of the present invention would access that redirect URL. The exemplary embodiment of the present invention would continue to access each successive redirect URL until a webpage with content were encountered. Because in the circumstances of tracking a user's activity through sessions, it is common for online stores to assign a non-canonical URL to each user that views a webpage, the exemplary embodiment of the present invention would then back up to the redirect URL that immediately preceded the final URL in the redirect chain.

Continuing now with reference to FIG. 5A, in view of the above-outlined processes, the exemplary embodiment depicted in FIG. 5A would test in exemplary test function 570 whether there were any redirects. If there were any redirects, then the "yes" path 571 would be taken to proceed with exemplary process 573 to access each successive URL in the chain of redirects. For each successive URL in the chain of redirects, exemplary test function 575 would test whether the subject redirect URL is the last URL in the redirect chain. If the subject redirect URL is not the last URL in the redirect chain, then the "no" path 576 would be taken to return to exemplary process 573 to access the next successive URL in the chain of redirect URL's. In the exemplary embodiment; exemplary process 573 and exemplary test process 575 are repeated until the last URL in the redirect chain is reached.

If the subject redirect URL is the last URL in the redirect chain, then the "yes" path 577 would be taken to exemplary process 580. In exemplary process 580, the exemplary embodiment would back step to access the first URL in the chain of redirects that is on the same domain as the last URL in the chain. Then, in exemplary process 585, the redirected URL (the one that preceded the last URL in the redirect chain, is provided to exemplary process 545. The normalization processes would then be performed on the redirected URL, beginning again with exemplary process 545.

It will be understood by someone with ordinary skill in the art that the number of instances of a particular logic function depicted in the drawings of the present application are exemplary. In some embodiments, multiple instances of a single, commonly described logic function may be performed in a single instance to, for example, optimize performance. For example, in order to minimize Internet access, when checking for redirects, to the extent to which multiple redirects may be provided on a single web page, one exemplary embodiment would retrieve a page once, and the results would be retained, rather than accessing the page multiple times.

Returning with reference to exemplary test process 570, if there were no redirects, then the "no" path 572 would be taken to exemplary process 515. In the exemplary embodiment, exemplary process 515 would determine from the URL provided to it corresponding "store software" that had been used by the vendor/domain to create the URL. Then, according to the corresponding "store software," exemplary process 515 would analyze the URL provided to it for any occurrence of a plurality of certain key words, phrases, or patterns, e.g., the phrase "sessionid=". Then exemplary process 522 would build a test-normalized URL, eliminating unnecessary key words or phrases according to patterns determined in exemplary process 515. Once a test-normalized URL was built in exemplary process 522, an access 528 of the URL provided to process 515 and an access 526 for the test-normalized URL would then be made. In exemplary test process 530, if the same webpage resulted for each access, then the "yes" path 531 would be taken. If the same webpage resulted for each access and the "yes" path 531 were taken, then in exemplary process 535, the test-normalized URL would be used as the normalized URL, and the normalization process would be completed and control would be returned in exemplary return process 540' to the process (e.g., element 420 depicted in FIG. 4) that invoked the exemplary normalization processes depicted in FIG. 5A.

If, on the other hand, the same webpage did not result for each access, the "no" path 532 would be taken. If the "no" path 532 were taken, then the normalized URL would be set in exemplary process 560 to the URL that had been provided to process 515, the normalized URL would be reported in exemplary process 563 for human editor review, and the normalization process would be completed and control would be returned in exemplary return process 540' to the process (e.g., element 420 depicted in FIG. 4) that invoked the exemplary normalization processes depicted in FIG. 5A.

Figure 5C:
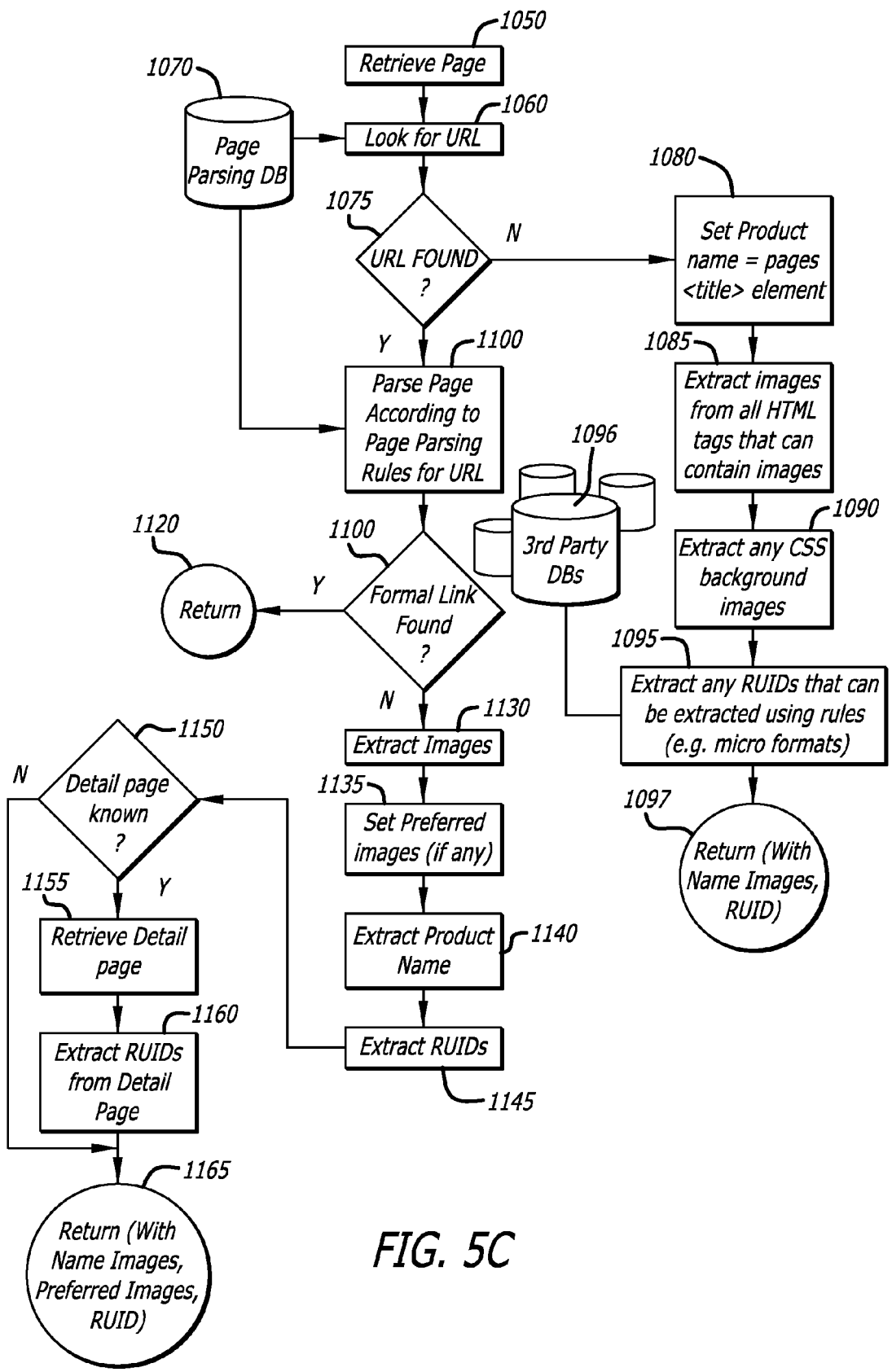
FIG. 5C is a high-level flow diagram depicting high-level logic functions of an exemplary page parsing and product information extraction process in the exemplary embodiment of the present invention.

Returning with reference to FIG. 4, once the user-supplied URL has been normalized, product identification information would be extracted from the website associated with the normalized URL in exemplary page parsing and product information extraction process 421. FIG. 5C is a high-level flow diagram depicting high-level logic functions of an exemplary page parsing and product information extraction process (e.g., element 421 depicted in FIG. 4) in the exemplary embodiment of the present invention.

In the exemplary embodiment, the logic functions of the exemplary page parsing and product information extraction process (e.g., element 421 depicted in FIG. 4) would comprise exemplary page retrieving process 1050. In exemplary page retrieving process 1050, the Internet web page addressed by the normalized URL would be retrieved. Then, in exemplary look for URL process 1060, exemplary page parsing data base 1070 would be searched for the normalized URL.

Continuing with reference to FIG. 5C, in test process 1075, the search results of process 1060 would be tested to determine whether the normalized URL had been found on exemplary page parsing data base 1070. If the normalized URL had not been found on exemplary page parsing data base 1070, then in exemplary process 1080, the product name would be set to the retrieved page's <title> element. Then, in exemplary process 1085, the exemplary embodiment would extract from the retrieved page, any images available from all HTML (Hyper Text Mark-up Language) tags that are adapted for containing images.

Then, in exemplary process 1090, the exemplary embodiment would extract any images available in CSS background. As will be understood by someone with ordinary skill in the art, CSS files may comprise formatting instructions for content of a web page, and may also comprise images, and/or addresses for images for display in a web page. Thus, in exemplary process 1090, the exemplary embodiment would extract any background images available in any CSS file for the retrieved page.

Then, in exemplary process 1095, the exemplary embodiment would extract any RUIDs (Relatively Unique Identifiers) that can be extracted from the retrieved page using standard rules, such as, e.g., microformats. In the exemplary embodiment, RUIDs are useful for creating a cross-vendor, cross-variation view of a product—that is, RUIDs comprise a cross-vendor product identifier. An RUID for a product may comprise a well known industry assigned identifier, including, for example: ISBN for books, ISSN for magazines, UPC codes for many products. Because industry-wide product identifiers may be assigned in cooperation with a vendor, and because vendors may use different rules for associating products with such industry-wide product identifiers, reference herein to such industry-wide product identifiers may be made generally as a "relatively unique" identifier or RUID. RUIDs, e.g., ISBN, ISSN, UPC, and the like, may be extracted from a web pages as in exemplary process 1095 of FIG. 5C, or may be determined through third-party databases (e.g., Muze for CDs)/manufacturer databases 1096.

Once any RUIDs that can be extracted from the retrieved page have been extracted in exemplary process 1095, the exemplary embodiment would return in exemplary return process 1097, processing control to the calling process (e.g., exemplary page parsing and extraction process 421 depicted in FIG. 4) along with the product name, product images and RUIDs.

It will be understood by someone with ordinary skill in the art that depiction herein of any logic function or process as a performing, or calling, function or process, or as a performed, or called, function or process, is illustrative and non-limiting. Rather, without departing from the spirit of the invention, logic functions or processes that may be depicted herein as a performed, or called, function processes, may be programmed in line with the logic functions that may be depicted herein as a performing, or calling function or process.

Continuing with reference to FIG. 5C, returning with reference to exemplary test process 1075, if in test process 1075, according to the search results of process 1060, the normalized URL had been found on exemplary page parsing data base 1070, then in exemplary page parse process 1100, the exemplary embodiment would parse the retrieved page according to page parsing rules for the normalized URL on the page parsing data base. In the exemplary embodiment, parsing the retrieved page according to page parsing rules for the normalized URL on the page parsing data base would comprise executing a subroutine named in the record or entry in the exemplary page parsing data base 1070 for the normalized URL.

Once the retrieved page had been parsed in process 1100, then the exemplary embodiment would perform exemplary permalink test process 1110 to determine whether or not a "permalink" had been found. As will be understood by someone with ordinary skill the art, a "permalink" is a vendor normalized URL for a page. If the retrieved page contains a "permalink" (a vendor normalized URL) for the page, then the exemplary embodiment would return in exemplary return process 1120, processing control to the calling process (e.g., exemplary page parsing and extraction process 421 depicted in FIG. 4). As will described in more detail below, if the retrieved page contains a "permalink," then the exemplary embodiment will use the permalink URL as the URL to be normalized and will, upon returning to the calling process (e.g., exemplary page parsing and extraction process 421 depicted in FIG. 4), repeat the process to normalize the URL.

If, on the other hand, it is determined in exemplary permalink test process 1110 that no permalink has been found, then the exemplary embodiment would extract images from the retrieved page in exemplary image extraction process 1130 according to page parsing rules for the normalized URL from the exemplary page parsing data base 1070 for the normalized URL. The exemplary embodiment would then identify and set any preferred images in exemplary preferred image process 1135 according to page parsing rules for the normalized URL from the exemplary page parsing data base 1070 for the normalized URL. The exemplary embodiment would then extract the product name in exemplary product name extraction process 1140 according to page parsing rules for the normalized URL from the exemplary page parsing data base 1070 for the normalized URL. The exemplary embodiment would extract any RUIDs in exemplary RUID extraction process 1145 according to page parsing rules for the normalized URL from the exemplary page parsing data base 1070 for the normalized URL.

The exemplary embodiment would then test in exemplary detail page test process 1150 whether or not any detail pages were known. If the result of exemplary detail page test process 1150 is that no detail page(s) is known, then the exemplary embodiment would return in exemplary return process 1165, processing control to the calling process (e.g., exemplary page parsing and extraction process 421 depicted in FIG. 4). The return with exemplary return process 1165 would include product name, images, preferred images and RUIDs that had been extracted.

If, on the other hand, exemplary detail page test process determines that any detail pages were known, then the exemplary embodiment would retrieve the detail page(s) in exemplary retrieve detail page process 1155, and would extract RUIDs from the detail page(s) before returning in exemplary return process 1165, processing control to the calling process (e.g., exemplary page parsing and extraction process 421 depicted in FIG. 4) with product name, images, preferred images and RUIDs that had been extracted.

Figure 7:
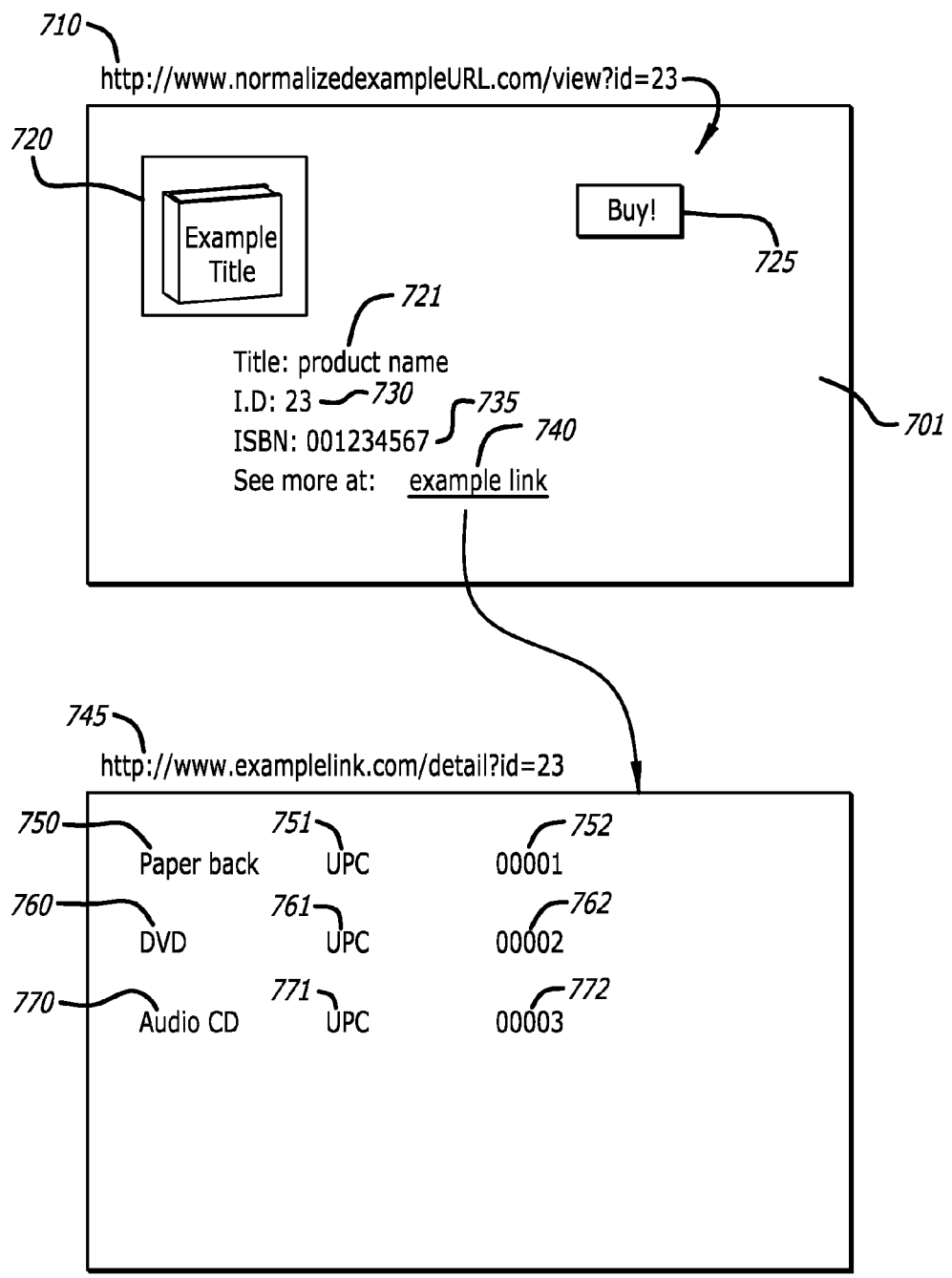
FIG. 7 is a graphic representation depicting a simple example of illustrative product and other information available at an illustrative webpage addressed by an exemplary normalized URL and depicting an illustrative detail page chain of reference for identifying further illustrative product and other information concerning related variations of a product.

FIG. 7 is a graphic representation depicting a simple example of illustrative product and other information available at an illustrative webpage addressed by an exemplary normalized URL and depicting an illustrative detail page chain of reference for identifying further illustrative product and other information concerning related variations of a product.

FIG. 7 depicts an exemplary normalized URL 710 and graphically depicts an exemplary corresponding webpage 701. As depicted in FIG. 7, the exemplary webpage 701 displays an image 720, a vendor's "Buy!" button 725, exemplary product identifier 730, an exemplary ISBN 735, and an exemplary "see more at" link 740.

Additionally, the exemplary URL content of the exemplary webpage 701 depicted in FIG. 7 would contain a link (example link 740) to a "see more at" address as follows:

http://www.examplelink.com/detail?id=23

According to page parsing rules previously referenced above for the normalized URL from the exemplary page parsing data base 1070 for the normalized URL, the exemplary embodiment would further parse the link information from the exemplary webpage 701. More specifically, the exemplary embodiment would identify the link http://www.examplelink.com/detail?id=23 (depicted as element 745). The exemplary embodiment would navigate to the link address (http://www.examplelink.com/detail?id=23) and would extract information about variations of the product from the webpage 702 located at the linked address 745. The exemplary embodiment would identify three variations of the product depicted in the above-mentioned normalized URL, namely, a paper back (element 750) variation, a DVD (element 760) variation, and an audio CD (element 770) variation. For each variation, the exemplary embodiment would identify as an RUID, an RUID type as "UPC" (elements 751, 761 and 771 respectively), and exemplary UPC values 00001 (element 752), 00002 (element 762), and 00003 (element 772).

As will be described below in general terms with respect to FIG. 4, using the information parsed from the normalized URL and the "see more at" linked web page, the exemplary embodiment would update, or if the product was as yet unknown to the exemplary embodiment, would build, product identification information and relationships for the product. More specifically, if the product was as yet unknown to the exemplary embodiment, the exemplary embodiment would create a database entry for the product. In the illustrative example, the exemplary embodiment would associate the ISBN as the RUID with the product, would assign the corresponding RUID type a value of "isbn" (or some code that identified ISBN as the basis for the RUID), and would associate the UPC codes for each of the corresponding variations (750-752, 760-762, and 770-772) with the product, and would assign the corresponding RUID type a value of "upc" (or some code that identified UPC as the basis for the RUID).

Returning with reference to FIG. 4, once the user-supplied URL has been normalized, and to the extent possible, product identification information has been extracted, the exemplary embodiment would proceed with exemplary product test process 425. In exemplary product test process 425, an exemplary URL-product mapping database 430 would be searched to determine whether the product was already "known" (found on the database). If the product was not found on the exemplary URL-product mapping database 430, then the RUID product mapping database 431 would also be checked for each RUID found in the parsing process. If the product was still not found, then the "no" path 427 would be taken to proceed with exemplary add product process 470.

Exemplary process 470 would add a new product to exemplary product database 456. In adding a new product to exemplary product database 456, the exemplary embodiment would assign a product identifier to the new product. The product identifier could be a next available identifier in a list of available product identifiers. Or the product identifier could be the combination of an RUID and RUID type. In the exemplary embodiment, once a new product is added to the exemplary product database 456, the exemplary embodiment uses the processes and logic described herein to associate variations of the same "logical" product with the single product identifier in order to provide a vendor neutral, cross-vendor, cross-variation view of the product.

Continuing with reference to FIG. 4, in exemplary process 475, an association between the URL and the product would be added to the exemplary URL-product mapping database 430. In exemplary process 476, any RUID(s) that had been identified would be associated with the product and the RUID(s) would be added to an RUID-Product mapping database ("DB") 431. In exemplary choose image process 477, the critiquing user would be presented with images (see, e.g., FIG. 6B, exemplary images 632, 633, and 634) that had been extracted from the relevant website (see, e.g., elements 630 and 631 in FIGS. 6A and 6B) from which to choose. The critiquing user would be provided with the option to select any of the images (see, e.g., FIG. 6B, exemplary images 631, 632, and 633) that had been extracted from the relevant website. The critiquing user would also be provided with the option (see, e.g., elements 635, 640, 645) to upload images from the user's computer. Then in exemplary add images process 478, any uploaded and chosen images will be added to the image-product mapping database 480. Then, in exemplary process 440, the exemplary embodiment would receive the critique of the product input by the critiquing user.

Then, in exemplary process 445, the user's critique of the product would be associated with the product (e.g., a relationship between the user's critique of the product and the product would be saved in the exemplary critique database 446). Then, the process of adding the critiquing user's critique would be completed and control would be returned in exemplary return process 450 to the process that invoked the processes depicted in FIG. 4.

If, in exemplary test process 425, it was determined that the product was already known (found in the database), then the "yes" path 426 would be taken to proceed with exemplary present known images process 435. In exemplary present known images process 435, images of the product already available ("known") in the exemplary system would be retrieved from the image-product mapping DB 480 and presented to the critiquing user. See, e.g., exemplary known images 620, 622 and 624 depicted in FIGS. 6A and 6B.

Then, in exemplary choose image process 477, the critiquing user would be presented with images (see, e.g., FIG. 6B, exemplary images 632, 633, and 634) that had been extracted from the relevant website (see, e.g., elements 630 and 631 in FIGS. 6A and 6B) from which to choose. The critiquing user would be provided with the option to select any of the images (see, e.g., FIG. 6B, exemplary images 631, 632, and 633) that had been extracted from the relevant website. The critiquing user would also be provided with the option (see, e.g., elements 635, 640, 645) to upload images from the user's computer. Then in exemplary add images process 478, any uploaded and chosen images will be added to the image-product mapping database 480. Then, in exemplary process 440, the exemplary embodiment would receive the critique of the product input by the critiquing user.

Then, in exemplary process 445, the user's critique of the product would be associated with the product (e.g., a relationship between the user's critique of the product and the product would be saved in the exemplary Critique database 446). Then, the process of adding the critiquing user's critique would be completed and control would be returned in exemplary return process 450 to the process that invoked the processes depicted in FIG. 4.

As described previously above, before displaying the exemplary "Add This" user interface 600 depicted, for example, in FIG. 6A, the exemplary embodiment of the present invention would analyze the URL that the user supplied and, as described for an exemplary embodiment above, would normalize the URL, determine product identification information, and would "bundle" the normalized URL with the product in a database. When the exemplary "Add This" user interface 600 depicted, for example, in FIG. 6A, is displayed, the product name would be displayed in the exemplary product name field 610. The normalized URL would be displayed in the exemplary "From URL" field 615. If the product and URL were known to the system (as would have been identified, e.g., in exemplary processes 425 and 460 depicted in FIG. 4), then existing images, e.g., exemplary images 620, 622 and 624, known to the exemplary embodiment would be displayed to the user.

It will be understood by someone with ordinary skill in the art that the depiction of three exemplary images (elements 620, 622 and 624) is illustrative and not a limitation of the present invention. A greater or lesser number of images could be displayed, depending, for example, on the number of images for the product known to the system, and on any space limitations that the particular system controlled.

FIGS. 6A and 6B are graphic representations depicting an exemplary graphic user interface screen via which the exemplary embodiment would prompt the critiquing user to pick one of any known images (see, e.g., exemplary known image elements 620, 622, and 624), FIGS. 6A and 6B further depict an exemplary prompt 630 to select image(s) from a particular URL 631. If the critiquing user entered a URL 631, the exemplary embodiment would normalize the URL, extract images from the html page the normalized URL references, and present the extracted images (e.g., exemplary images 632, 633, and 634 depicted in FIG. 6B) according to a logic flow similar to that described above with respect to FIGS. 4, and 5A-5C.

FIGS. 6A and 6B further depict a prompt (see, e.g., exemplary upload prompt 635, exemplary browse button 645, and exemplary upload address input field 640) to the critiquing user to upload an image from the critiquing user's computer to the exemplary website.

FIGS. 6A and 6B further depict that in the exemplary embodiment, the critiquing user would be prompted to input a critique. See, e.g., exemplary critique input field 650 and corresponding upward and downward scroll buttons 651 and 652.

FIGS. 6A and 6B further depict that in the exemplary embodiment, the uploading user would be prompted to input tag words to be associated with the user's critique. See, e.g., exemplary tag word input field 660 and corresponding upward and downward scroll buttons 661 and 662.

FIGS. 6A and 6B further depict that in the exemplary embodiment, the user would be allowed to identify one or more existing "lists", e.g., exemplary list options 670, 672 and 674, or to create a new "list" with which the user's critique and the product critiqued should be associated. See, e.g., exemplary "Create New List" link 676.

FIGS. 6A and 6B further depict that in the exemplary embodiment, once the critiquing user had completed the critique, the exemplary user interface would provide an exemplary "Save and Go Back" button 680 and an exemplary "Save and View" button 685. Clicking the "Save and Go Back" button 680 would save the critique and would return the critiquing user to the screen from which the critiquing user navigated to the exemplary "Add This" user interface 600 depicted in FIG. 6A.

BENEFITS

The above-described method for providing a cross-variation, cross-vendor view of critiques of a product provides shopping users with a cohesive view of critiques or ratings for a product that includes variations of the product that are not relevant to the ratings.

The above-described method also provides a benefit of enhancing the strength of recognition by various search engines. For example, if an illustrative rating website recorded ratings without providing a cross-variation, cross-vendor association of the ratings for a product, EXAMPLE SEARCH ENGINE would separately recognize ratings for each variation of the product, and, depending on the circumstances, could separately recognize ratings for each vendor for each variation. That is, each variation would be cited by a comparatively few ratings.

As compared to the separate recognition of ratings for each variation and/or vendor as described above, the exemplary embodiment would provide on the same webpage, a consolidated view of critiques for various variations of a product offered by various vendors. That is, as compared to each variation of a product being cited by a comparatively few ratings, the above-described method of associating ratings with a cross-variation, cross-vendor view of a product would result in a higher number of ratings for the cross-variation, cross-vendor view of a product than would result if the ratings for each variation and/or vendor were recorded separately.

As will be understood by someone with ordinary skill in the art, Search Engines, such as, for example, GOOGLE®, list web pages that match a user's search term according to a "strength." Such Search Engines sometimes evaluate the "strength" of each web page that matches a user's search term according to the number of cites of that web page.

That is, if a single web page is cited by many users, then EXAMPLE SEARCH ENGINE would assign the web page a higher strength than a web page that is cited by fewer users. EXAMPLE SEARCH ENGINE would evaluate consolidated ratings for (cites to) a single webpage featuring a cross-variation, cross-vendor view of a product as stronger than ratings for (cites to) different webpages that each feature individual variations of the product.

The benefit of such an evaluation by Search Engines of higher strength is that the single webpage featuring a cross-variation, cross-vendor view of a product would be listed more favorably (higher on the search results list; closer to the beginning of the list) than would be separate webpages featuring individual variations for which fewer ratings (cites to) are recorded.

It will be understood by someone with ordinary skill in the art that listings featured higher on (closer to the top of) a Search Engine's search results list are desirable. It will be understood by someone with ordinary skill in the art that listings featured higher on (closer to the top of) a Search Engine's search results list are more likely to be selected for investigation by a searching user. It will be further understood by someone with ordinary skill in the art that the more likely a search user's selection of a listing on a Search Engine's search results, the more likely the selected listing will achieve a desirable result (which, depending on the web page, may be a click through to a vendor website, a purchase on a vendor website, etc.).

Other features of the invention are implicit in the above-provided description and/or are depicted and/or implicit in the accompanying Figures.

FACSIMILE REPRODUCTION OF COPYRIGHT MATERIAL

A portion of the disclosure of this patent document contains material which is subject to copyright protection by the copyright owner, ThisNext, Inc., its successors and assigns. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A method using a computer for creating a cross-variation, cross-vendor view of a product, said method comprising:
   A) receiving a first pick by a first user of a first product, wherein the first pick comprises a first Internet address;
   B) navigating to the first Internet address;
   C) obtaining from the first Internet address:
      1) an image of the first product, and
      2) a set of information associated with the first product;
   D) creating a first display of the first product comprising the image of the first product;
   E) receiving a second pick by a second user of a second product, wherein the second pick comprises a second Internet address;
   F) navigating to the second Internet address;
   G) obtaining from the second Internet address:
      1) an image of the second product, and
      2) a set of information associated with the second product;
   H) determining, using a computer processor, that the first product and the second product are variants of the same product, wherein the determination is made by analyzing the set of information associated with the first product and the set of information associated with the second product;
   I) creating a second display of the first product, wherein the second display of the first product comprises the image of the first product and the image of the second product.

* * * * *